United States Patent [19]  
Sakurai et al.

[11] 4,159,256  
[45] Jun. 26, 1979

[54] CATALYST FOR POLYMERIZING OLEFINS AND POLYMERIZATION METHOD OF OLEFINS CARRIED OUT THEREWITH

[75] Inventors: Hisaya Sakurai; Hideo Morita; Tadashi Ikegami; Masayoshi Miya; Katsuhiko Takaya, all of Kurashiki, Japan

[73] Assignee: Asahi Kasei Kogyo Kabushiki Kaisha, Osaka, Japan

[21] Appl. No.: 876,823

[22] Filed: Feb. 10, 1978

[30] Foreign Application Priority Data

Jun. 2, 1977 [JP] Japan .................................. 52-64006
Jun. 9, 1977 [JP] Japan .................................. 52-67303
Jun. 13, 1977 [JP] Japan .................................. 52-68834
Jun. 17, 1977 [JP] Japan .................................. 52-70991

[51] Int. Cl.² .............................................. C08F 4/64
[52] U.S. Cl. .......................... 252/429 B; 252/431 C; 526/124; 526/125; 526/127; 526/128
[58] Field of Search ........... 252/429 B, 429 C, 431 R, 252/431 C, 431 N

[56] References Cited
U.S. PATENT DOCUMENTS

| 3,670,043 | 6/1972 | Kobicek et al. ............. 252/429 B X |
| 3,676,418 | 7/1972 | Tashiro et al. .............. 252/429 B X |
| 3,784,481 | 1/1974 | Lassau et al. ................ 252/429 B X |
| 3,823,196 | 7/1974 | Morikawa et al. .......... 252/429 B X |
| 4,004,071 | 1/1977 | Aishima et al. .............. 252/429 C X |
| 4,027,089 | 5/1977 | Aishima et al. .............. 252/429 B X |

Primary Examiner—Patrick Garvin  
Attorney, Agent, or Firm—Sprung, Felfe, Horn, Lynch & Kramer

[57] ABSTRACT

Novel high active catalysts useful for highly stereospecific polymerization of olefin which enables to produce polymer of low content of catalyst residue, and of good grain size having a high stereoregularity can be obtained by a combination of [A] a solid catalyst component obtained by reacting and/or grinding a specified organomagnesium component (i) with a specified chlorosilane compound containing Si-H (ii) to obtain a solid (1) and reacting said solid (1) with a titanium compound containing at least one halogen atom (2) and a carboxylic acid or a derivative thereof (3) and [B] a component consisting of an organometallic compound and a carboxylic acid or a derivative thereof. The organomagnesium component is of the formula

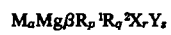

wherein $\alpha$ is a number of 0 or greater than 0; $\beta > 0$, p, q, r, and s are each a number of 0 or greater; $p+q+r+s = m\alpha + 2\beta$ wherein m is the valency of M; M is a metal element of the 1st to the 3rd group of the Periodic Table; $R^1$ and $R^2$ are the same or different hydrocarbon radicals having 1 to 20 carbon atoms; X and Y are the same or different radicals selected from the group consisting of halogen, $OR^3$, $OSiR^4R^5R^6$, $NR^7R^8$ and $SR^9$ wherein $R^3$, $R^4$, $R^5$, $R^6$, $R^7$ and $R^8$ are each hydrogen atom or a hydrocarbon radical having 1 to 20 carbon atoms and $R^9$ is a hydrocarbon radical having 1 to 20 carbon atoms, and chlorosilane is of the formula

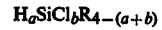

wherein a and b are each a number greater than 0, having the relationships $a \leq 2$ and $a+b \leq 4$ wherein R is a hydrocarbon radical having 1 to 20 carbon atoms.

32 Claims, 2 Drawing Figures

CATALYST FOR POLYMERIZING OLEFINS AND POLYMERIZATION METHOD OF OLEFINS CARRIED OUT THEREWITH

DETAILED DESCRIPTION OF THE INVENTION

The present invention relates to highly active catalysts for highly stereospecific polymerization of olefins and methods of polymerizing olefins in which said catalysts are used. Particularly, the present invention is suitable for polymerizing stereospecifically propylene, butene-1, pentene-1, 4-methyl-pentene-1, 3-methyl-butene-1 and the like olefins. The present invention is suitable also for copolymerizing said olefins with ethylene or other olefins.

It has been well known that stereospecific polymers are obtained by contacting olefins with Ziegler-Natta catalyst system comprising a transition metal compound of a metal of the 4th to the 6th A group of the Periodic Table and an organometallic compound of a metal of the 1st to the 3rd group of the Periodic Table. Particularly, a combination of a titanium halide and an organoaluminum compound such as triethylaluminum or diethylaluminum chloride is widely used in commercial production as catalysts for stereospecific polymerization of olefins.

Although polymerization of olefins such as propylene carried out with this catalyst results in a relatively high yield of boiling heptane insoluble polymers, i.e. stereospecific polymers, polymerization activity of the catalyst is not fully satisfactory and removal of catalyst residue from resultant polymer is required.

Recently, as highly active catalysts for polymerization of olefins, many catalyst systems have been proposed which comprise an inorganic or organo-magnesium compound and a titanium or vanadium compound, or above-mentioned two components and an electron-donor. For example there are descriptions such as those using magnesium halide (Japanese Laid Open Patent Application (hereinafter abbreviated as JLOPA) No. 47-9342 [corresponding to British patent (hereinafter abbreviated as BP)]1335887], 48-16986 [BP 1387888], 48-16987 [BP 1387889], 48-16988 [BP 1387890], 50-126590, 51-57789 and the like), those using a magnesium alkoxide JLOPA No. 49-149193, FR-7621221 those using an alkylmagnesium JLOPA 47-32082, BP 1373981 Japanese patent publication No. 51-11672 those using a Grignard compound (JLOPA No. 48-83193, BP 139001), description of Japanese patent publication No. 43-13050, CA-739550, FR 943488 as the one using Mg(OH)Cl, descriptions of Japanese patent publication No. 51-37194 as the one in which halogenated magnesium is treated with $Si(OR)_nX_{4-n}$ (X is a halogen) and then a titanium or vanadium compound is supported thereon. However, these systems hardly be used per se as catalysts for industrial stereo-regular polymerization of olefins having both sufficient polymerization activity and stereoregularity because some of them show notable activity for propylene polymerization but with too much production of amorphous polymer or other of them show high stereoregularity but with insufficiency in polymerization activity. Particularly, they are insufficient in polymer yield per solid catalyst component and produce polymers having a large content of halogen which brings about the corrosion of equipments of production process and molding machine, and physical properties of obtained product are also poor.

We have endeavoured to improve these points and, as a result, found a solid obtained by reacting a Si-H bond-containing chlorosilane compound as a reaction reagent with a solution containing an inert-hydrocarbon-soluble organomagnesium component to prepare a solid of magnesium compound containing halogen. This solid does not belong to any of above mentioned organo- or inorganic-magnesium compounds and is an entirely different magnesium-containing solid. Thus we have found that a solid obtained by reacting and/or grinding said solid with a titanium compound and a carboxylic acid or a derivative thereof have extremely superior performance as a catalyst for polymerizing olefins, and thus reached and completed the present invention. The catalysts of the present invention have better performance as compared with either of the above-mentioned catalyst systems as evident from examples hereinafter described.

Namely, the present invention is directed to catalysts for polymerizing olefins comprising [A] a solid catalyst component obtained by reacting and/or grinding components (1), (2) and (3), and [B] a component consisting of an organometallic compound and a carboxylic acid or a derivative thereof, said component (1) being a solid obtained by reacting (i) an organomagnesium component represented by the general formula $M_\alpha Mg_\beta R_p^1 R_q^2 X_r Y_s$ [wherein $\alpha$ is a number 0 or greater than 0; $\beta > 0$; p, q, r, s are each numbers 0 or greater than 0, respectively, having the relationship of $p+q+r+s=m\alpha+2\beta$; M is a metal element of the 1st to 3rd group of the Periodic Table; m is the valency of M; $R^1$ and $R^2$ are the same or different hydrocarbon groups having 1–20 carbon atoms, and X and Y are the same or different groups selected from the group consisting of halogen, $OR^3$, $OSiR^4R^5R^6$, $NR^7R^8$, or $SR^9$ wherein $R^3$, $R^4$, $R^5$, $R^6$, $R^7$ and $R^8$ are hydrogen atom or a hydrocarbon group having 1–20 carbon atoms and $R^9$ is a hydrocarbon group having 1–20 carbon atoms] with (ii) a chlorosilane compound containing Si-H bond represented by the general formula $H_a SiCl_b R_{4-(a+b)}$ wherein a and b are numbers greater than 0, having the relationships of $a+b \leq 4$ and R is a hydrocarbon group having 1–20 carbon atoms, said component (2) being a titanium compound containing at least one halogen atom, and said component (3) being a carboxylic acid or a derivative thereof.

The first feature of the present invention is in that the catalyst efficiency per Ti metal and per solid catalyst component is extremely high. For example, as evident from Example 65 hereinafter described, the catalyst efficiency of 12,000 g-polypropylene (PP)/g-solid catalyst or 444,000 g-PP/g-titanium component was obtained in the case of propylene polymerization in hexane. In the case of Example 38 in which propylene polymerization was conducted in liquid propylene, a catalyst efficiency of 275,000 g-PP/g-titanium component·hour or 7700 g-PP/g-solid catalyst·hour or higher was readily attained.

With the activity of the catalyst of the present invention the polypropylene formed at the time of polymerization shows the Ti content and Cl content of about 2 ppm and 60 ppm, respectively e.g. in case of Example 65. This indicates that the removal of catalyst residue from the polypropylene polymerized by the catalyst is not necessary. In other words this shows that the catalyst is of extremely good performance which enables to carry out a process free of ash-removal step. Grinding of said solid material is particularly effective for the improvement of activity in the present invention. In addition to grinding, further improvement of catalyst efficiency is attained by treating the solid catalyst with a tetravalent titanium compound containing at least one halogen atom.

The second feature of the present invention is in that higher stereoregularity is achieved in addition to the abovementioned high activity. Incidentially, the value of boiling heptane insoluble portion is as high as 95.8%.

The third feature of the present invention is in that the obtained polymer is of good grain size and polymer powder having a high bulk density can be obtained.

Further, the fourth feature of the present invention is in that the colour of articles molded by using a polymer produced with the present catalyst is very good.

Figure 1:
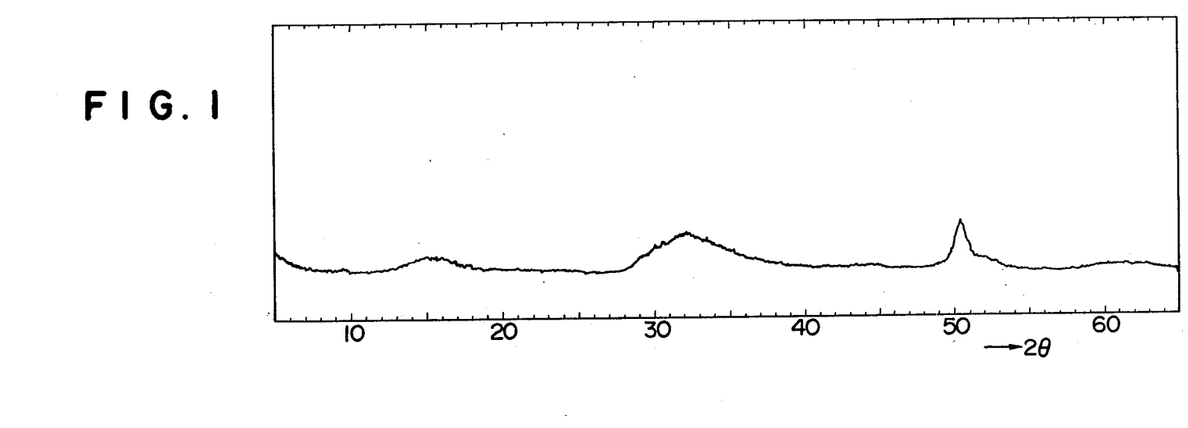
FIG. 1 is a X ray diffraction chart of the solid catalyst obtained in example 65.
Figure 2:
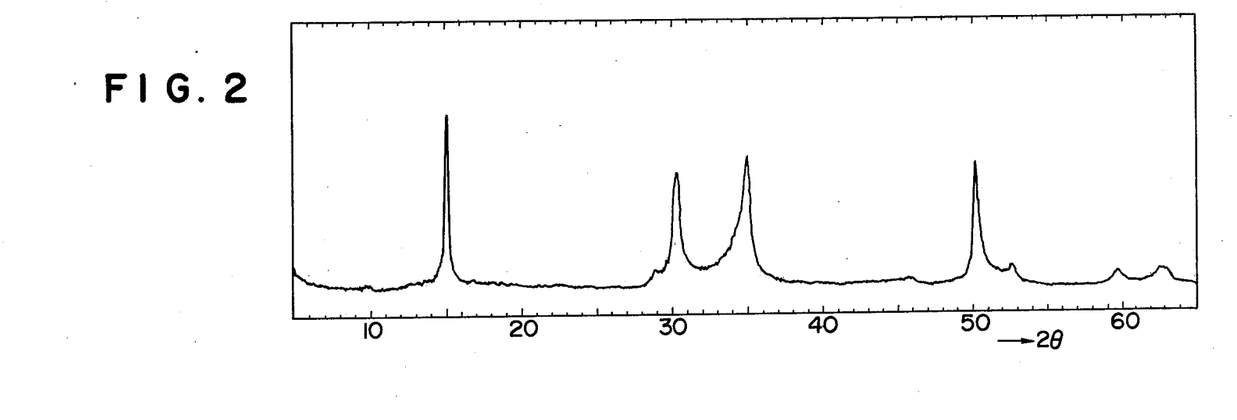
FIG. 2 is a X-ray diffraction chart of the solid catalyst synthesized according to the example 2 of JLOPA 48-16986, the abscissa (2 $\theta$) shows 2 times the diffraction angle and the ordinate shows relative ratio of intensity.

Although the essential cause of the above mentioned remarkable performance of the catalyst of the present invention is not yet certain, important function leading to the essential cause is conceivably attributable to the reaction and/or grinding of the highly active magnesium solid component having a large surface area and containing the alkyl group possessing reduction power, a titanium compound, and a carboxylic acid or a derivative thereof. The effect of the present invention cannot be expected when compounds such as magnesium chloride are used, as evident also from comparative examples. The difference between the above mentioned solid catalyst of the present invention and solid catalysts prepared by using magnesium chloride is evident also from the X ray diffraction analysis.

Each of the component raw materials and reaction conditions employed for the preparation of the catalyst of the present invention will be described hereinafter in detail.

Firstly, explanation will be given with respect to the organomagnesium component represented by the general formula $M_\alpha Mg_\beta R_p^1 R_q^2 X_r Y_s$ (wherein $\alpha$, $\beta$, p, q, r, s, M, $R^1$, $R^2$, X, Y have the same meanings as described above).

This component is shown in the form of a complex compound of an organomagnesium but includes so-called Grignard compound RMgX, R$_2$Mg and all of the complexes of these compounds with other metallic compounds. The hydrocarbon groups represented by $R^1$-$R^9$ in the above-mentioned formula, include alkyl having 1-20 carbon atoms, cycloalkyl, and aryl group, for example, methyl, ethyl, propyl, butyl, amyl, hexyl, decyl, octyl, dodecyl, cyclohexyl, phenyl group and the like. It is preferable that $R^1$ is particularly an alkyl group. It does not matter even if $R^3$-$R^8$ are hydrogen atoms. As halogen, fluorine, chlorine, bromine and iodine are used but chlorine is particularly preferable.

As metal atom M, any metal element of the first to the third group of the Periodical Table can be used. For example, sodium, potassium, lithium, calcium, beryllium, zinc, barium, boron, aluminum and the like can be mentioned.

Further there are relationships that $\beta/\alpha$ is equal to or greater than 0.1, preferably equal to or greater than 0.5 and $(r+s)/(\alpha+\beta)$ is in the range of 0-2.0.

As catalyst components to be used in the present invention, organomagnesium complexes or compounds soluble in an inert hydrocarbon medium are preferable. As such organomagnesium complexes, those complexes in which M is either of aluminum, zinc, boron or beryllium, the ratio of magnesium to metal atom M, $\beta/\alpha$ is equal to or greater than 0.5, particularly 1-10, the ratio of the sum of the groups X+Y to the sum of metal atom, $(r+s)/(\alpha+\beta)$ is 0 or greater than 0 and 1.0 or less, preferably 0-0.8 (inclusive) and X and Y are groups other than halogen in the above-mentioned general formula are used.

As organomagnesium compounds, those dialkylmagnesium compounds of the above-mentioned general formula, in which $\alpha=0$, $r+s=0$, $R^1$ and $R^2$ are alkyl groups, and alkoxy and siloxymagnesium compounds in which $\alpha=0$, $(r+s)/\beta=1$, and X and Y are $OR^3$ or $OSiR^4R^5R^6$ are used.

As such compounds, n-C$_4$H$_9$MgC$_2$H$_5$, n-C$_4$H$_9$Mg sec.—C$_4$H$_9$, n-C$_4$H$_9$Mg-tert.-C$_4$H$_9$, n-C$_6$H$_{13}$MgC$_2$H$_5$, n-C$_8$H$_{17}$MgC$_2$H$_5$, (n-C$_6$H$_{13}$)$_2$Mg, (n-C$_8$H$_{17}$)$_2$Mg, (n-C$_{10}$H$_{21}$)$_2$Mg, (sec.-C$_4$H$_9$)$_2$Mg, (tert.-C$_4$H$_9$)$_2$Mg, n-C$_4$H$_9$Mg(OC$_3$H$_7$), n-C$_4$H$_9$Mg(OC$_4$H$_9$), n-C$_4$H$_9$Mg(OC$_5$H$_{11}$), n-C$_4$H$_9$Mg(OC$_6$H$_{13}$), n-C$_4$H$_9$Mg(OC$_8$H$_{17}$), C$_5$H$_{11}$Mg(OC$_4$H$_9$), C$_6$H$_{13}$Mg(OC$_3$H$_7$), n-C$_4$H$_9$Mg(OSiH.CH$_3$.C$_4$H$_9$), n-C$_4$H$_9$Mg(OSi.H.C$_6$H$_5$.C$_4$H$_9$) and the like are mentioned.

As compounds of this kind, a complex compound of alkylmagnesium halide or dialkylmagnesium with a Lewis base such as ether, ketone, amine or the like or a solution of these compounds in ether is also useful.

Among the above-mentioned organomagnesium component, those which are particularly preferable are the complex represented by the general formula described above and consisting of compounds of two metals of M and Mg which are soluble in an inert hydrocarbon.

These organomagnesium compounds or organomagnesium complexes are synthesized by reacting an organomagnesium compound represented by the general formula, $R^1MgQ$ or $R_2^1Mg$ (wherein $R^1$ has the same meaning as above-mentioned and Q is halogen) with an organometallic compound represented by the general formula $MR_m^2$ or $MR_{m-1}^2H$ wherein M, $R^2$ and m have the same meaning as above-mentioned, in an inert hydrocarbon medium such as hexane, heptane, cyclohexane, benzene, toluene and the like at a temperature in the range from room temperature to 150° C. and if necessary further reacting the resulting reaction product with an alcohol, water, siloxane, amine, imine, mercaptan or a dithiocompound.

Further the organomagnesium compound or organomagnesium complex can be synthesized by reacting MgX$_2$, $R^1MgX$ with $MR_m^2$, $MR_{m-1}^2H$ or by reacting $R^1MgX$, MgR$_2^1$ with $R_n^2MX_{m-n}$ or by reacting $R^1MgX$, MgR$_2$ with $Y_nMX_{m-n}$ wherein M, $R^1$, $R^2$, X, Y have the above-mentioned meanings and include the case where X and Y are halogen, and n is a number of 0 to m.

The description will be given with regard to chlorosilane compounds (ii) containing Si-H bond, represented by the general formula $H_aSiCl_bR_{4-(a+b)}$ wherein a, b and R have the same meaning as above-mentioned.

The hydrocarbon groups represented by R in the above-mentioned formula, include alkyl, cycloalkyl, aryl, for example, methyl, ethyl, propyl, butyl, amyl, hexyl, decyl, cyclohexyl, phenyl groups and the like.

Preferably the hydrocarbon group is alkyl containing 1–10 carbon atoms and a lower alkyl group such as methyl, ethyl, propyl or the like is particularly preferable. The range of the value of a and b is defined by $a > 0$, $b > 0$, $a + b \leq 4$ and $0 < a \leq 2$.

As such compounds, $HSiCl_3$, $CH_3SiHCl_2$, $C_2H_5SiHCl_2$, $n-C_3H_7SiHCl_2$, $i-C_3H_7SiHCl_2$, $n-C_4H_9SiHCl_2$, $i-C_4H_9SiHCl_2$, $C_6H_5SiHCl_2$, $4-ClC_6H_4SiHCl_2$, $CH_2=CHSiHCl_2$, $C_6H_5CH_2SiHCl_2$, $1-C_{10}H_7SiHCl_2$, $CH_2=CHCH_2SiHCl_2$, $CH_3SiH_2Cl$, $C_2H_5SiH_2Cl$, $(CH_3)_2SiHCl$, $(CH_3)(i-C_4H_9)SiHCl$, $(CH_3)(C_6H_5)SiHCl$, $(C_2H_5)_2SiHCl$, $(C_6H_5)_2SiHCl$ alone or a mixture of these compounds or a mixture partially containing any of these compounds are preferable. As particularly preferable chlorosilane compounds, trichlorosilane, monomethyldichlorosilane, dimethylchlorosilane, ethyldichlorosilane, etc. can be mentioned.

As evident from specific example and comparative example, in case of the use of silicon compound containing no Si-H bond, preferable result cannot be obtained.

The description will be given with regard to the reaction between an organomagnesium compound (i) and a chlorosilane compound (ii). The reaction between an organomagnesium compound or organomagnesium complex and a chlorosilane compound can be carried out in an inert reaction medium e.g. an aliphatic hydrocarbon such as hexane, heptane, an aromatic hydrocarbon such as benzene, toluene, xylene, an alicyclic hydrocarbon such as cyclohexane, methylcyclohexane or an ether type medium such as ether, tetrahydrofuran and the like or a mixture of these compounds.

From the point of catalyst performance, an aliphatic hydrocarbon medium is preferable.

With regard to the reaction temperature, there is no particular limitation but from the point of the reasonable rate of reaction, the reaction is preferably carried out at a temperature of 40° C. or higher. With regard to the reaction ratio of the two kinds of component, there is no particular limitation but it is recommended to use preferably the range of 0.01 mol to 100 mol chlorosilane component and most preferably 1.0 mol to 10 mol relative to one mol of the organomagnesium component.

With regard to the reaction method, either of a simultaneous addition method in which 2 kinds of the catalyst components are at the same time introduced into a reaction zone (method a) or a method in which a chlorosilane component is charged in the reaction zone in advance and thereafter an organomagnesium complex component is introduced into the reaction zone (method b) or a method in which an organomagnesium complex component is charged in the reaction zone in advance, and chlorosilane component is added (method c), is possible but particularly method (b) gives preferable result. When an organomagnesium compound is insoluble, it is possible also to use a chlorosilane compound as a reaction reagent in the reaction medium in the form of heterogeneous treatment reaction. Also in such an occasion, the above-mentioned conditions of temperature and reaction molar ratio are preferable.

The composition and the structure of the solid material obtained according to the above-mentioned reaction may vary according to the kinds of starting raw materials, and reaction condition, but from the analytical value of composition it is inferred that the magnesium solid material having halogen contains about 0.1–2.5 millimol of alkyl group having Mg-C bond per g solid material. This solid material has an extremely large specific surface area showing a value as high as 100–300 $m^2/g$ according to the measurement by B.E.T. method. The solid material of the present invention has an extremely higher surface area compared with the conventional magnesium halide solid and it is a large characteristic feature that said solid material is an active magnesium solid material having a very large surface area and containing alkyl group possessing reduction power.

Then description will be made with regard to the titanium compound (2) containing at least one halogen atom.

As tetravalent titanium compound a halide of and an alkoxyhalogenide of titanium compound, such as titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, etc., are used solely or in the form of mixture. Preferable compounds are those containing 3 or more halogen, particularly preferable is titanium tetrachloride.

Then description will be made with regard to halides of trivalent titanium. As halides of trivalent titanium, titanium trichloride, titanium tribromide, titanium triiodide can be mentioned. A solid solution containing one component of these compounds may also be used. As solid solutions, a solid solution of titanium trichloride and aluminum trichloride, a solid solution of titanium tribromide and aluminum tribromide, a solid solution of titanium trichloride and vanadium trichloride, a solid solution of titanium trichloride and ferric chloride, a solid solution of titanium trichloride and zirconium trichloride and the like can be mentioned. Among these, preferable is titanium trichloride, and a solid solution of titanium trichloride and aluminum trichloride ($TiCl_3 \cdot \frac{1}{3}AlCl_3$).

Description will be given with regard to the carboxylic acid and its derivatives (3).

The carboxylic acid and its derivatives having up to 30 carbon atoms include aliphatic, alicyclic and aromatic, saturated and unsaturated mono and polycarboxylic acids, their acyl halides, their acid anhydrides, and their esters.

As the carboxylic acid, for example, formic acid, acetic acid, propionic acid, butyric acid, valeric acid, oxalic acid, malonic acid, succinic acid, maleic acid, acrylic acid, benzoic acid, toluic acid, terephthalic acid, etc. can be mentioned. Among them, benzoic acid and toluic acid are preferable.

As the carboxylic halide, for example, acetyl chloride, propionyl chloride, n-butyryl chloride, isobutyryl chloride, succinoyl chloride, benzoyl chloride, tolyl chloride, etc. can be mentioned. Among them, aromatic carboxylic acid halide such as benzoyl chloride, tolyl chloride are particularly preferable.

As the carboxylic anhydride, for example, acetic anhydride, propionic anhydride, n-butyric anhydride, succinic anhydride, maleic anhydride, benzoic anhydride, toluic anhydride, anisic anhydride, phthalic anhydride, etc. can be mentioned. Among them, benzoic anhydride, toluic anhydride and anisic anhydride are particularly preferable.

As the carboxylic acid ester, for example, ethyl formate, methyl acetate, ethyl acetate, n-propyl acetate, ethyl propionate, ethyl n-butyrate, ethyl valerate, ethyl capronate, ethyl heptanoate, di-n-butyl oxalate, monoethyl succinate, diethyl succinate, ethyl malonate, di-n-butyl malate, methyl acrylate, ethyl acrylate, mehtyl methacrylate, methyl benzoate, ethyl benzoate, n- and isopropyl benzoate, n-, i-, sec.- and tert-butyl benzoate, methyl p-toluate, ethyl p-toluate, i-propyl p-toluate, n- and i-amyl toluate, ethyl o-toluate, ethyl m-toluate, methyl p-ethylbenzoate, ethyl p-ethylbenzoate, methyl anisate, ethyl anisate, i-propyl anisate, methyl p-ethoxybenzoic acid, ethyl p-ethoxybenzoic acid, methyl terephthalate, etc. can be mentioned. Among them, esters of aromatic carboxylic acid are preferable, and methyl benzoate, ethyl benzoate, methyl p-toluate, ethyl p-toluate, methyl anisate, ethyl anisate are particularly preferable.

Description will be given with regard to the synthesis method of solid catalyst component obtained by reacting the above-mentioned solid material (1), titanium compound (2), carboxylic acid or its derivative (3) and-/or grinding these substances but separately in case of (I) tetravalent titanium compound in the case of (II) trivalent titanium compound and in the case of (III) simultaneouse use of tetravalent and trivalent titanium compound.

In the case of (I), there are mentioned, a method of grinding the solid obtained by simultaneously reacting the above mentioned solid material, titanium compound and carboxylic acid or a derivative thereof (synthesis ①), a method of grinding the solid obtained by firstly reacting the above mentioned solid material and the titanium compound followed by further reaction with the carboxylic acid or a derivative thereof (synthesis ②), and a method of grinding the solid obtained by firstly reacting the above mentioned solid material and the carboxylic acid or a derivative thereof followed by reaction with the titanium compound synthesis ③). Either of them may be employed but the latter two methods are preferred. Especially synthesis ③ gives favorable results.

In the case of (II), various kinds of methods are possible for preparing a solid component from said solid material, a halogenated trivalent titanium and a carboxylic acid or a derivative thereof, but especially following three methods give favorable results; namely a method wherein the three components are ground together (synthesis ①), a method wherein the solid material and the carboxylic acid are firstly contacted and then mechanical grinding is carried out after the addition of the halogenated trivalent titanium (synthesis ②), and a method wherein the solid material and the halogenated trivalent titanium compound are mechanically ground and contacted and followed by the treatment with a carboxylic acid or a derivative thereof (synthesis ③).

In the case of (III), a method wherein the abovementioned solid material (1), a tetravalent titanium compound (2-1) a trivalent titanium compound (2-2) and a carboxylic acid or a derivative thereof (3) are simultaneously ground (synthesis ①), a method wherein the solid obtained by reacting (1) and (2-1) is treated with (3) followed by grinding thereof together with (2-2) (synthesis ②), a method wherein the solid obtained by reacting (1) and (3) is treated with (2-1) followed by grinding thereof together with (2-2) (synthesis ③), a method wherein the solid obtained by reacting (1) and (2-1), is ground after addition of (2-2) and (3) (synthesis ④), and the like may be mentioned. Among them, synthesis ③ is preferred.

Further, by treating the solid catalyst prepared by the method described above with a tetravalent titanium compound containing at least one halogen atom, further increase of catalyst efficiency, i.e. the first feature of the present invention, is attained.

Next, with regard to the method wherein the solid catalyst synthesized according to the above-mentioned method is further treated with a tetravalent titanium halide, explanation will be given for the above-mentioned (I), (II) and (III) individually.

In the case of (I), there are three possible methods wherein the solid catalysts synthesized according to (I)-①, (I)-② and (I)-③ are respectively treated with a tetravalent titanium halide, but the latter two methods are preferred.

In the case of (II), there are four possible methods wherein the solid catalyst synthesized according to the methods (II)-①, (II)-②, (II)-③ and (II)-④ are respectively treated with a tetravalent titanium halide.

In the case of (III), there may be mentioned a method wherein a solid material (1), a tetravalent titanium compound (2-1), a trivalent titanium compound (2-2), and a carboxylic acid or a derivative thereof (3) are simultaneously ground, followed by the treatment with a tetravalent titanium halide (synthesis ①), a method wherein the solid obtained by reacting (1) and (2-1) is treated with (3), ground together with (2-2) and treated with a tetravalent titanium halide (synthesis ②), a method wherein the solid obtained by reacting (1) and (3) is treated with (2-1), ground together with (2-2), and further treated with a tetravalent titanium halide (synthesis ③), a method wherein the solid obtained by reacting (1) and (2-1) is ground together after addition of (2-2) and (3) and further treated with a tetravalent titanium halide (synthesis ④, a method wherein the solid obtained by reacting (1) and (2-1) is treated with (3), ground together with (2-2) and further treated with a tetravalent titanium halide (synthesis ⑤), and the like. Among them, the methods ②, ③, ④, and ⑤ are preferred.

Next, the operation of reacting and/or grinding the above-mentioned solid material, titanium compound, and a carboxylic acid or carboxylic acid derivative will be explained.

(i) Firstly explanation will be made with regard to the reaction between a solid material obtained by reacting an organomagnesium component and a chlorosilane compound or a reaction product of this solid material and a carboxylic acid or a derivative thereof and a titanium compound.

The reaction may be carried out using an inert reaction medium or using an undiluted titanium compound per se as a reaction medium without using an inert reaction medium. As an inert reaction medium, for example, there may be mentioned aliphatic hydrocarbons such as hexane and heptane, aromatic hydrocarbons such as benzene, toluene, and xylene, alicyclic hydrocarbons such as cyclohexane and methylcyclohexane, and the like, among which aliphatic hydrocarbons are preferred. The reaction temperature and the concentration of the titanium compound, though not specifically limited, are preferably in the range of 80° C. or higher and 2 mol/l of a titanium compound concentration or higher, respectively. Still more preferably, undiluted titanium compound per se is used for carrying out reaction as a reaction medium. With regard to a reaction mol ratio, a sufficiently excessive amount of a titanium compound relative to the magnesium component in the solid material gives preferable results.

(ii) Secondly, explanation will be given about the reaction between a solid material obtained by reacting an organomagnesium component and a chlorosilane compound or a reaction product of this solid material with a titanium compound and a carboxylic acid or a derivative thereof.

The reaction is carried out using an inert reaction medium. As the inert reaction medium, any of the above mentioned aliphatic, aromatic or alicyclic hydrocarbons may be used. The reaction temperature, though not specifically limited, preferably ranges from room temperature to 100° C. In case a solid material and a carboxylic acid or a derivative thereof are reacted, the ratio of the two components of the reaction is not specifically limited. However, it is recommended that the amount of carboxylic acid or a derivative thereof ranges between 0.001 mol–50 mols, preferably 0.005 mol–10 mols relative to one mol of alkyl group contained in the organomagnesium solid component (the solid of magnesium compound containing halogen). In case the reaction product of the solid material and a titanium compound is reacted with a carboxylic acid or a derivative thereof, the ratio of the two components of the reaction ranging 0.01 mol–100 mols, preferably 0.1 mol–10 mols of the amount of carboxylic acid or a derivative thereof relative to one mol of titanium atom in the organomagnesium solid component is recommended.

(iii) Thirdly, explanation will be given with regard to the method of grinding solid formed according to the above mentioned reactions (i)–(ii) in the presence or in the absence of a reaction reagent. As a grinding means, well known mechanical grinding means such as a rotary ball mill, a vibration ball mill, an impact ball mill, and the like may be employed. Grinding time is in the range of 0.5–100 hours, preferably 1–30 hours, and grinding temperature is in the range of 0°–200° C., preferably 10°–150° C.

(iv) Forthly, explanation will be given with respect to the treatment of the solid component obtained according to (i)–(iii) with a tetravalent titanium compound. The reaction is carried out using an inert reaction medium or utilizing the titanium compound itself as a reaction medium. As an inert reaction medium, there may be mentioned, for example, aliphatic hydrocarbons such as hexane or heptane, aromatic hydrocarbons such as benzene, toluene, etc., and alicyclic hydrocarbons such as cyclohexane, methylcyclohexane, etc., but aliphatic hydrocarbons are preferred. The concentration of the titanium compound is preferably if it is 2 mol/l or higher, especially preferred is the use of the titanium compound itself as a reaction medium. Although reaction temperature is not specifically limited, preferable results are obtained when reaction is conducted at a temperature of 80° C. or higher.

Although the composition and the structure of the solid catalyst obtained according to the above mentioned reactions (i) to (v) vary depending on starting material and reaction condition, it was found from the analysis of composition that the solid catalyst contains approximately 1–10 percent by weight of titanium and has a surface area of 50–300 m²/g.

Organometallic compounds used as component of [B] are compounds of metals of I–III group in the Periodic Table and especially an organoaluminum compound and complexes containing an organomagnesium are preferred. As organoaluminum compounds, those represented by the general formula $AlR_t^{10}Z_{3-t}$ (wherein $R^{10}$ is a hydrocarbon group having 1–20 carbon atoms, Z is a member selected from hydrogen, halogen, alkoxy, aryloxy and siloxy, and t is a number of 2–3) are used solely or as a mixture. In the above formula, the hydrocarbon group having 1–20 carbon atoms which is represented by $R^{10}$ includes aliphatic hydrocarbons, aromatic hydrocarbons and alicyclic hydrocarbons.

Specifically, compounds, for example, triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum, diethylaluminum hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydroxaluminum dimethyl, ethylmethylhydroxyaluminum diethyl, ethyldimethylsiloxyaluminum diethyl, aluminum isoprenyl and the like, and mixtures thereof are recommended.

A combination of these alkylaluminum compounds with the above mentioned solid catalyst provides highly active catalyst, and especially trialkylaluminum and dialkylaluminum hydride are preferable because it enables to attain the highest activity.

The complexes which contain an organomagnesium are those hydrocarbon soluble organomagnesium complexes represented by the general formula $M_\alpha Mg_\beta R_p^1 R_q^2 X_r Y_s$ (wherein $\alpha$ and $\beta$ are a number greater than 0 with the proviso that $\beta/\alpha$ is 0.1–10, p, q, r and s are each 0 or a number greater than 0, having the relationship of $p+q+r+s=m\alpha+2\beta$ and $0 \leq (r+s)/(\alpha+\beta) < 1$, M is aluminum, zinc, boron or beryllium atom; m is the valency of M, $R^1$ and $R^2$ are the same or different hydrocarbon groups having 1–20 carbon atoms, X and Y are the same or different groups indicating $OR^3$, $OSiR^4R^5R^6$, $NR^7R^8$, or $SR^9$ wherein $R^3$, $R^4$, $R^5$, $R^6$, $R^7$ and $R^8$ are hydrogen or a hydrocarbon group having 1–20 carbon atoms, $R^9$ is a hydrocarbon groups having 1 to 20 carbon atoms, and especially complexes wherein M is aluminum are preferred.

The carboxylic acid or a derivative thereof to be added to an organometallic compound may be the same with or different from the carboxylic acid or a derivative thereof used for the preparation of the solid catalyst component. As to the manner of addition, the two components may be mixed prior to the polymerization or they may be added to the polymerization system, separately. Especially preferred is to add separately the product obtained by previously reacting a part of organometallic compound with a carboxylic acid or a derivative thereof and the remaining organometallic compound to the polymerization system.

The ratio of the two components to be combined ranges in the carboxylic acid amount 0 mol–10 mols, preferably 0 mol–1 mol relative to a mol of the organometallic compound.

The high stereoregularity of the polymer which is one of the effectiveness of the present invention can be attained only in case where a carboxylic acid or its derivative is added to both of the solid catalyst component [A] and the organometallic component [B]. It is not possible to obtain the polymer of extremely high stereoregularity of the present invention when a carboxylic acid or its derivative is added only to [A] or [B] component.

The catalyst of the present invention comprising the solid catalyst component and the component of an organometallic compound incorporated with a carboxylic acid or a derivative thereof may be added to the polymerization system under the polymerization condition or it may be blended prior to the polymerization.

The ratio of the component of an organometallic compound with or without a carboxylic acid or a derivative thereof relative to 1 gram of the solid catalyst component preferably ranges 1 milli mol–3000 milli mol based on an organometallic compound.

The present invention relates to highly active catalysts for highly stereospecific polymerization of olefins. Especially the present invention is suitable for polymerizing stereoregularly propylene, butene-1, pentene-1, 4-methylpentene-1, 3-methylbutene-1 and the like olefins singly. Also it is suitable for copolymerizing said olefins with ethylene or other olefins. Further it is suitable for polymerizing ethylene with a better efficiency. It is also possible in the present invention to add hydrogen, a halogenated hydrocarbon or an organometallic compound which is liable to cause chain transfer in order to regulate molecular weight of polymer.

As to the manner of polymerization, a usual suspension polymerization, a bulk polymerization in liquid monomers, or a gas phase polymerization can be employed. Suspension polymerization may be carried out at room temperature - 150° C. by introducing the catalyst together with a polymerization solvent e.g. an aliphatic hydrocarbon such as hexane or heptane, an aromatic hydrocarbon such as benzene, toluene or xylene, or an alicyclic hydrocarbon such as cyclohexane or methylcyclohexane, and introducing an olefin such as propylene under a pressure of 1–20 Kg/cm$^2$ under inert atmosphere. Bulk polymerization of olefins may be carried out under the condition of an olefin such as propylene etc. being in the liquid state using a catalyst and the liquid olefin as a polymerization solvent. For example, propylene can be polymerized in propylene liquid under a pressure of 10–45 Kg/cm$^2$ at a temperature ranging from room temperature to 90° C. On the other hand, gas phase polymerization can be carried out under the condition of an olefin such as propylene being in gas state, e.g. under a pressure of 1–50 Kg/cm$^2$ and at a temperature ranging from room temperature to 120° C. in the absence of a solvent, by means of a fluidized bed, a movable bed or mechanical stirrer so that the olefin such as propylene and the catalyst can be well contacted.

Hereinafter the present invention will be explained by examples. In examples, insoluble portion of n-heptane extraction means remaining part formed by six hour extraction of polymer with boiling n-heptane, and inherent viscosity was measured in tetralin at 135° C.

EXAMPLE 1

(i) Synthesis of a hydrocarbon-soluble organomagnesium complex

Di-n-butyl-magnesium (138.0 g) and 19.0 g of triethylaluminum were taken up in a flask having been flushed with nitrogen, together with 1 liter of n-heptane. The mixture was reacted with stirring at 80° C. for 2 hours to obtain an organomagnesium complex solution. Analysis of this complex revealed that it had composition of $AlMg_{6.0}(C_2H_5)_{2.9}(n-C_4H_9)_{12.1}$ and an organometal concentration of 1.16 mol/l.

(ii) Synthesis of a solid material by the reaction with a chlorosilane compound

To a 2-liter flask fitted with a dropping funnel and a cooler, having been fully flushed with nitrogen, there was charged 1 mol of a solution of trichlorosilane $(HSiCl_3)$ in n-heptane (1 mol/l) under the stream of nitrogen. While the flask was maintained at 65° C., 500 mmol of the abovementioned solution of an organomagnesium complex was added dropwise over one hour through the dropping funnel. Thereafter, the mixture was reacted at 65° C. for one hour. A white solid material thus formed was filtered off, washed with n-hexane and dried to obtain 42.4 g of a white solid (A-1). Analysis of this solid showed that it contained 9.21 mmol Mg, 19.1 mmol Cl, 1.73 mmol Si, and 0.55 mmol alkyl groups per gram of the solid. The specific surface area measured by the B.E.T. method was 273 m$^2$/g.

(iii) Synthesis of a solid catalyst

The above white solid (5.7 g) was taken up in a flask having been fully flushed with nitrogen. Thereto were added 60 ml of n-hexane and 4.5 mmol of ethyl benzoate in n-hexane (0.25 mol/l). The mixture was reacted with stirring at 80° C. for one hour. The solid portion was filtered off, washed fully with n-hexane and dried to obtain white powder (B-1).

The above white solid (B-1, 5.0 g) and 40 ml of titanium tetrachloride were charged into an autoclave having been flushed with nitrogen. The mixture was reacted with stirring at 130° C. for 2 hours. The solid portion was then filtered off, washed with n-hexane and dried to obtain a solid of a light yellow color (C-1). Then 4.0 g of this solid (C-1) was transferred together with 25 steel balls having a diameter of 10 mm into a steel ball mill having an inside diameter of 95 mm and a length of 100 mm and grinding was carried out for 5 hours by mounting it on a vibrating machine (1000 vibration/min. or more) to obtaine a solid catalyst (S-1). Analysis of this catalyst showed that it had a Ti content of 2.1 wt.%.

(iv) Slurry polymerization of propylene

The solid catalyst (S-1) (40 mg), triethylaluminum (2.4 mmol) and ethyl benzoate (0.8 mmol) were fed to a 1.5 l autoclave the inside of which had been flushed with nitrogen and dried in vacuo together with n-hexane having been sufficiently dehydrated and evacuated. Polymerization was carried out with stirring for 2 hours while maintaining the inside temperature at 60° C. and pressurizing propylene up to 5.0 Kg/cm$^2$ and maintaining the total pressure of 4.8 Kg/cm$^2$ to obtain 124 g of n-hexane insoluble polymer and n-hexane soluble polymer of 4.1 g. The catalyst efficiency was 12400 g-PP/g-titanium component.hr.propylene pressure, the remaining part of n-hexane insoluble polymer after extraction with n-heptane was 95.8%, inherent viscosity was 5.9 dl/g. The characteristic properties of particle were good with a bulk density of 0.35 g/cm$^3$ and the proportion of 35–150 mesh particles was 92%.

EXAMPLE 2

By using a solution prepared in advance by mixing a hexane solution of triethylaluminum (1 mol/l) (1.6 mmol) and a hexane solution of ethyl benzoate (1 mol/l) (0.8 mmol), a solid catalyst (S-1) (40 mg) prepared in Example 1 and triethylaluminum (1.6 mmol), slurry polymerization of propylene was carried out similarily as in Example 1 to obtain 163 g of hexane insoluble polymer and 5.8 g of hexane soluble portion. The remaining portion of hexaneinsoluble polymer after extraction with n-heptane was 94.7% and the catalyst efficiency was 17,100 g-PP/g-titanium component.hr.-propylene pressure.

EXAMPLE 3

To a 1.5 l autoclave having been sufficiently flushed with nitrogen and dried in vacuo, 350 g of liquefied propylene was introduced. While maintaining the inside temperature at 60° C. and after adding 10 mg of a solid catalyst (S-1) synthesized in Example 1, 1.6 mmol of triethylaluminum and 0.6 mmol of ethyl benzoate into the autoclave, polymerization was carried out at 60° C. for 2 hours with stirring to obtain 108 g of polymer. The catalyst efficiency was 257000 g-PP/g-titanium component·hr and the remaining portion of this polymer after extraction with n-heptane was 94.5%.

COMPARATIVE EXAMPLE 1

A solid catalyst was synthesized by using magnesium chloride in place of the solid material obtained by the reaction of an organomagnesium complex compound and a chlorosilane compound of Example 1. Namely, 5.7 g of anhydrous magnesium chloride was reacted with 4.5 mmol of an ethyl benzoate solution similarily as in Example 1 and further reacted with 30 ml of titanium tetrachloride at 130° C. for 2 hours and the product was ground to synthesize a solid catalyst. The analysis of this solid catalyst showed the Ti-content of 0.54% by weight. By using 400 mg of this solid catalyst, 3.2 mmol of triethylaluminum and 1.2 mmol of ethyl benzoate, slurry polymerization of propylene was carried out similarily as in Example 1 to obtain 38 g of hexane-insoluble polymer and 15.3 g of hexane-soluble polymer. The remaining portion of the hexane-insoluble polymer after extraction with boiling n-heptane was 75.8% and the catalyst efficiency was 47.5 g-PP/g-solid catalyst·hr and 1760 g-PP/g-titanium component·hr·propylene pressure.

COMPARATIVE EXAMPLE 2

In the reaction of the organomagnesium complex compound and the chlorosilane of Example 1-(ii), 100 ml of n-heptane solution of methyl-trichlorosilane ($CH_3SiCl_3$) (1 mol/l) was fed in place of $HSiCl_3$, temperature was elevated up to 65° C. and 100 mmol of the organomagnesium complex solution synthesized similarily as in Example 1-(I) was dropped by using a dropping funnel at 65° C. with stirring over one hour and reaction was continued for one hour, resultant solid was separated by filtration, washed with n-hexane and dried to obtain 0.46 g of white solid. Compared with Example 1-(ii), the yield of solid material was about 1/20.

By using this solid material, processing was carried out as in Example 1-(iii), a solid catalyst was synthesized. The analysis of this solid material showed Ti-content of 5.0% by weight.

By using 200 mg of this solid catalyst 3.2 mmol of triethylaluminum and 1.2 mmol of ethyl benzoate, slurry polymerization of propylene was carried out in the same manner as in Example 1 to obtain 51 g of hexane-insoluble polymer and 8.9 g of hexane-soluble polymer. The remaining portion of the hexane-insoluble polymer after extraction with boiling n-heptane was 72.5%. The catalyst efficiency was 128 g-PP/g-solid catalyst·hr and 512 g-PP/g-titanium component·hr·propylene pressure. The bulk density of the hexane-insoluble polymer was 0.24 g/cm$^3$.

EXAMPLE 4

The solution of the organomagnesium complex (3 mol) synthesized according to the process same with that of Example 1-(i) was introduced in a flask, while maintaining a temperature of 65° C., 1.5 mol of monomethyldichlorosilane ($HSiCl_2CH_3$) was dropped over one hour with stirring to effect reaction, formed white solid was filtered off, washed with n-hexane sufficiently and dried. This solid (4.0 g) was reacted with ethyl benzoate according to the same manner as in Example 1 to synthesize a solid (B-4) which was further reacted with titanium tetrachloride to obtain a solid (C-4). This solid was ground as in Example 1 to give a solid catalyst (S-4). The analysis of this solid catalyst showed the titanium content of 2.3% by weight.

By using this solid catalyst (40 mg) and 2.4 mmol of triethylaluminum and 0.8 mmol of ethyl benzoate, slurry polymerization of propylene was carried out as in Example 1 whereby the result of Table 1 was obtained.

EXAMPLE 5

By using a solution prepared in advance by mixing a hexane solution of triethylaluminum (1 mol/l) (1.6 mmol) and a hexane solution of ethyl benzoate (1 mol/l) (0.8 mmol) and 40 mg of the solid catalyst (S-4) synthesized in Example 4 and 0.8 mmol of triethylaluminum, slurry polymerization of propylene was carried out according to the manner same as that of Example 1 to obtain the result of Table 1.

EXAMPLE 6

A solid material (3.8 g) synthesized by the reaction of an organomagnesium complex compound of example 1-(ii) and a trichlorosilane ($HSiCl_3$) was taken into a pressure-proof vessel having been sujficiently flushed with nitrogen, 80 ml of n-heptane solution of titanium tetrachloride having a concentration of 4.0 mol/l was fed thereto and reaction was carried out at 130° C. for 2 hours with stirring, resultant solid portion was filtered off, washed with n-hexane sufficiently, and dried to give a solid (A-6). This solid (1.9 g) was fed to a 200 ml pressure proof vessel having been sufficiently flushed with nitrogen, 60 ml of n-hexane and 6 ml of ethyl benzoate were introduced in the vessel and the mixture was heated to reflux to carry out reaction with stirring for one hour. A solid (B-6) was filtered off, washed with n-hexane sufficiently and dried. This solid was ground as in Example 1 to obtain a solid catalyst (S-6). The analysis of this solid catalyst showed the titanium content of 2.8% by weight.

By using 40 mg of this solid catalyst, 2.4 mmol of triethylaluminum and 0.8 mmol of ethyl benzoate, a slurry polymerization of propylene was carried out according to the same manner as that of Example 1 to obtain the result of Table 1.

EXAMPLE 7

By using a solution prepared by mixing in advance, a hexane solution of triethylaluminum (1 mol/l) (1.6 mmol) and a hexane solution of ethyl benzoate (1 mol/l) (0.8 mmol), 40 mg of the solid catalyst (S-6) synthesized in Example 6 and 0.8 mmol of triethylaluminum, slurry polymerization of propylene was carried out similarily as in Example 1 to obtain the result of Table 1.

Table 1

| Examples | Yield of hexane-insoluble polymer (g) | Hexane-soluble portion (g) | Remaining portion after extraction with n-heptane (%) | Catalyst efficiency [g-PP/g-Ti component · hr · propylene pressure] |
| --- | --- | --- | --- | --- |
| 4 | 118 | 3.7 | 96.0 | 12,800 |
| 5 | 163 | 5.3 | 94.7 | 17,700 |
| 6 | 114 | 4.7 | 94.4 | 10,200 |
| 7 | 157 | 6.9 | 93.6 | 14,100 |

EXAMPLE 8

(i) Synthesis of hydrocarbon-soluble organomagnesium complex

By introducing 27.60 g of di-n-butyl-magnesium, 3.80 g of triethylaluminum and 200 ml of hexane into a 500 ml flask having been flushed with nitrogen sufficiently and carrying out reaction at 80° C. for 2 hours, a solution of of an organomagnesium complex was obtained. The result of analysis showed that the composition of this complex was $AlMg_{6.0}(C_2H_5)_{2.9}(n-C_4H_9)_{12.1}$ and the concentration of the organometallic compound was 1.15 mol/l.

(ii) Synthesis of solid material by the reaction with a chlorosilane compound

The inside of a 500 ml flask equipped with a dropping funnel and a water-cooled reflux condenser was freed of oxygen and moisture by flushing with dry nitrogen, a 200 mmol of 2 mol/l hexane solution of monomethyldichlorosilane ($HSiCl_2CH_3$) under a nitrogen atmosphere was charged into the flask and the temperature of the mixture was elevated to 65° C. Then 100 mmol of the above-described solution of organomagnesium complex was taken into the dropping funnel after measurement and dropping was carried out at 65° C. with stirring over one hour and reaction was continued at this temperature for one hour. Resultant hydrocarbon-insoluble white precipitate was isolated, washed with hexane and dried to obtain 8.6 g of white solid material. The result of analysis of this solid material showed that it contained 9.27 mmol of Mg, 17.7 mmol of chlorine, 1.65 mmol of Si and 0.51 mmol of alkyl group. The specific surface area as measured by B.E.T. method was 285 $m^2/g$.

(iii) Reaction of a magnesium-containing solid and a carboxylic acid derivative after 5.0 g of the above-mentioned solid and 5.0 mmol of a 1 mol/l ethyl benzoate solution in hexane were charged into a pressure-proof vessel having been flushed with nitrogen and reaction was carried out at 80° C. with stirring for one hour, a solid portion was isolated by filtration, washed sufficiently with hexane and dried to give a white solid. The analysis of this solid showed that it contained 0.60 mmol of ethyl benzoate per 1 g of solid.

(iv) Synthesis of solid catalyst component

Grinding of 3.93 g of solid component synthesized as in (iii) and 0.33 g of titanium trichloride (AA grade $TiCl_3 \cdot \frac{1}{3}AlCl_3$ supplied from Toyo Stauffer Company) was carried out for 5 hours under a nitrogen atmosphere in a steel mill having an inside volume of 100 cm³ and containing 25, steel balls of 9 mmφ by using a vibration ball mill of more than 1000 vibration/min. The Ti content of the resultant solid catalyst (S-8) was 1.87% by weight.

(v) Polymerization of propylene in a solvent

Hundred mg of the solid catalyst component synthesized in (iv), 3.2 mmol of triethylaluminum, and 1.2 mmol of ethyl benzoate were introduced in a 1.5 l autoclave the inside of which has been flushed with nitrogen and evacuated, together with 0.8 l of dehydrated and deaerated hexane. While keeping the inside temperature of the autoclave at 60° C., propylene was pressurized up to a pressure of 5.0 Kg/cm² and polymerization was carried out for 2 hours while maintaining the total pressure of 4.8 Kg/cm² gauge to obtain the result of Table 2.

EXAMPLE 9

A solution prepared by mixing in advance 1.6 mmol of a hexane solution of triethylaluminum (1 mol/l) and 0.8 mmol of a hexane solution of ethyl benzoate (1 mol/l), 100 mg of the solid catalyst (S-8) synthesized in Example 8 and 0.8 mmol of triethylaluminum were used in carrying out slurry polymerization of propylene similarily as in Example 1 and the result of Table 2 was obtained.

EXAMPLE 10

Liquid propylene in an amount of 350 g was introduced in a 1.5 l autoclave the inside of which has been flushed with nitrogen and evacuated and the inside temperature was elevated up to 60° C. The solid catalyst (S-8) synthesized in Example 8 (25 mg), 2.4 mmol of triethylaluminum and 0.8 mmol of ethyl benzoate were added into an autoclave and polymerization was carried out for 2 hours while maintaining the inside temperature at 60° C. to obtain 112 g of polymer. The catalyst efficiency was 2230 g-PP/g·catalyst solid·hr, 119000 g-PP/g-titanium component·hr and the remaining portion of the polymer after extraction with boiling n-heptane was 92.8%.

EXAMPLE 11

The magnesium-containing solid (3.85 g) synthesized as in Example 8 (ii), 0.23 g of ethyl benzoate and 0.30 g of titanium trichloride (AA grade of titanium trichloride $TiCl_3 \cdot \frac{1}{3}AlCl_3$ supplied from Toyo Stauffer Company) were simultaneously ground under nitrogen atmosphere in a vibration ball mill for 5 hours. The titanium content of the resultant solid catalyst was 1.66% by weight.

By using 100 mg of a solid catalyst, 3.2 mmol of triethylaluminum and 1.2 mmol of ethyl benzoate, polymerization was carried out in a hexane solvent similarily as in Example 1 to obtain the result of Table 2.

EXAMPLE 12

The magnesium-containing solid (3.80 g) synthesized similarily as in Example 8 (ii) and titanium trichloride (0.30 g) (AA grade supplied from Toyo Stauffer Company) were simultaneously ground for 5 hours under nitrogen atmosphere in a vibration mill. Resultant solid was reacted with ethyl benzoate as in Example 1 (ii) to obtain a solid catalyst. The Ti-content of resultant solid catalyst was 1.71% by weight. By using 100 mg of the solid catalyst, 3.2 mmol of triethylaluminum and 1.2 mmol of ethyl benzoate, polymerization was carried out in a hexane solvent similarily as in Example 1 to obtain the result of Table 2.

COMPARATIVE EXAMPLE 3

By using magnesium chloride in place in the solid material obtained by the reaction of an organomagnesium complex compound and monomethyldichlorosilane in Example 8, a solid catalyst was synthesized similarily as in Example 8. The titanium content in the solid catalyst was 1.61% by weight.

By using 400 mg of the solid catalyst, 3.2 mmol of triethylaluminum and 1.2 mmol of ethyl benzoate, polymerization was carried out in hexane solvent according to the manner same with that of Example 1 to obtain the result of Table 2.

Table 2

| | yield of hexane-insoluble polymer (g) | hexane-soluble portion (g) | remaining portion after extraction with n-heptane (%) | catalyst efficiency g-PP/g-titanium component . hr . propylene pressure |
|---|---|---|---|---|
| Ex. 8 | 116 | 4.6 | 95.4 | 6200 |
| Ex. 9 | 160 | 6.9 | 94.3 | 8560 |
| Ex. 11 | 84 | 3.7 | 94.4 | 5060 |
| Ex. 12 | 105 | 4.4 | 94.9 | 6140 |
| Comparative Ex. 3 | 73 | 6.4 | 76.5 | 1130 |

EXAMPLE 13

(i) Synthesis of a hydrocarbon-soluble organomagnesium complex

To a 500 ml flask having been flushed with nitrogen 27.60 g of di-n-butyl magnesium, 3.80 g of triethylaluminum and 200 ml of hexane were introduced and reaction was carried out at 80° C. for 2 hours to obtain a solution of an organomagnesium complex. According to the result of analysis, this complex had a composition of $AlMg_{6.0}(C_2H_5)_{2.9}(n-C_4H_9)_{12.1}$ and a concentration of organometallic compound of 1.15 mol/l.

(ii) Synthesis of solid material by the reaction with a chlorosilane compound

The inside of a 500 ml flask equipped with a dropping funnel and a water-cooled reflux condenser, was freed of oxygen and moisture by the substitution with dry nitrogen, 200 mmol of a 2 mol/l hexane solution of monomethyldichlorosilane ($HSiCl_2CH_3$) was fed and the temperature of the mixture was elevated up to 65° C. Then 100 mmol of the above-mentioned organomagnesium complex solution was weighed and taken in the dropping funnel and dropped at 65° C. with stirring over one hour and reaction was continued for additional one hour at this temperature. Resultant hydrocarbon-insoluble white precipitate was isolated, washed with hexane, and dried to obtain 8.6 g of white solid. According to the result of analysis, this solid material contained 9.27 mmol of Mg, 17.7 mmol of Cl, 1.65 mmol of Si and 0.51 mmol of alkyl groups. The specific surface area as measured by B.E.T. method was 285 m²/g.

(iii) Reaction of a magnesium-containing solid, a carboxylic acid derivative and titanium tetrachloride To a pressure-proof vessel having been flushed with nitrogen, 5.0 g of the above-mentioned solid, 4.0 L mmol of 0.1 mol/l hexane solution of ethyl benzoate were fed and reaction was carried out at 80° C. with stirring for 1 hour, then solid portion was isolated by filtration, washed with hexane and dried to obtain white solid.

The result of this solid showed the content of 0.54 mmol of ethyl benzoate per 1 g of solid.

To a pressure-proof vessel having been flushed with nitrogen, 4.5 g of the above-mentioned solid and 60 ml of titanium tetrachloride were fed. After reaction was carried out at 100° C. with stirring for 2 hours, the solid portion was isolated by filtration, washed with hexane sufficiently and dried to obtain pale yellow solid.

(iv) Synthesis of solid catalyst

The solid component (3.93 g) synthesized in (iii) and 0.16 g of titanium trichloride (AA grade $TiCl_3.\frac{1}{3}AlCl_3$ supplied from Toyo Stauffer Company) were ground in a 100 cm³ steel mill containing 25, steel balls of 9 mm$\phi$ under nitrogen atmosphere for 5 hours by using a vibration ball mill which operated at 1000 vibration/min. whereby resultant solid catalyst (S-13) had a Ti-content of 3.34% by weight.

(v) Slurry polymerization of propylene

The solid catalyst (S-13) (40 mg) synthesized in (iv), 2.4 mmol of triethylaluminum and 0.8 mmol of ethyl benzoate were used to carry out slurry polymerization of propylene to obtain the result of Table 3.

EXAMPLE 14

A solution obtained by mixing in advance 1.6 mmol of a 1 mol/l hexane solution of triethylaluminum and 0.8 mmol of a 1 mol/l hexane solution of ethyl benzoate, 30 mg of the solid catalyst (S-13) synthesized in Example 13 and 0.8 mmol of triethylaluminum were used to carry out slurry polymerization of propylene to obtain the result of Table 3.

EXAMPLE 15

To a 1.5 l autoclave having been flushed with nitrogen and evacuated to vacuum, 350 g of liquid propylene was introduced and the inside temperature was elevated up to 60° C. The solid catalyst (S-13) (10 mg) synthesized in Example 13, 2.4 mmol of triethylaluminum and 0.8 mmol of ethyl benzoate were added to the autoclave and polymerization was carried out for 2 hours while keeping the inside temperature at 60° C. to obtain 130 g of polymer. The catalyst efficiency was 6500 g-PP/g-solid catalyst·hr and 195000 g-PP/g-titanium component·hr and the remaining portion of the polymer after extraction with boiling n-heptane was 93.3%.

COMPARATIVE EXAMPLE 4

For the solid obtained by reacting an organomagnesium complex compound with monomethyldichlorosilane, magnesium chloride is substituted in the method of Example 13 and the same procedure as that of Example 13 is used in other points in the synthesis of solid catalyst. The titanium content in the solid catalyst was 1.63% by weight.

By using 400 mg of the solid catalyst, 3.2 mmol of triethylaluminum and 1.2 mmol of ethyl benzoate polymerization was carried out in hexane solvent similarily as in Example 1 to obtain the result of Table 3.

Table 3

| | yield of hexane-insoluble polymer (g) | hexane-soluble portion (g) | remaining portion after extraction with n-heptane (%) | catalyst efficiency g-PP/g-Ti component . hr . propylene pressure |
|---|---|---|---|---|
| Ex. 13 | 142 | 4.5 | 96.1 | 10,600 |

Table 3-continued

| | yield of hexane-insoluble polymer (g) | hexane-soluble portion (g) | remaining portion after extraction with n-heptane (%) | $\left[\begin{array}{c}\text{catalyst efficiency}\\ \text{g-PP/g-Ti component . hr . propylene pressure}\end{array}\right]$ |
|---|---|---|---|---|
| Ex. 14 | 145 | 6.2 | 94.9 | 14,500 |
| Comparative Ex. 4 | 92 | 8.0 | 77.8 | 1,410 |

EXAMPLE 16

(I) Synthesis of a hydrocarbon-soluble organomagnesium complex

Di-n-butyl-magnesium (138.0 g), 19.0 g of triethylaluminum and 1 liter of n-heptane were introduced into a 2 liter flask having been flushed with nitrogen. The mixture was reacted with stirring at 80° C. for 2 hours to obtain a solution of an organomagnesium complex. Analysis of this complex showed that it had composition of $AlMg_{6.0}(C_2H_5)_{2.9}(n-C_4H_9)_{12.1}$ and an organometal concentration of 1.15 mol/l.

(II) Synthesis of a solid material by the reacton with a chlorosilane compound

A 2-liter flask fitted with a dropping funnel and a cooler was fully deaerated and dried. Under nitrogen atmosphere, 1.0 mol of trichlorosilane ($HSiCl_3$) in n-heptane (1 mol/l) was charged. While the flask was being maintained at 65° C., 500 mmol of the above organomagnesium complex solution was added dropwise through the dropping funnel over one hour. Thereafter, the reaction was allowed to proceed at 65° C. for additional one hour with stirring. A white solid thus formed was filtered off, washed with hexane and dried to obtain 42.4 g of a white substance (A-16). Analysis of this solid showed that it contained 9.18 mmol Mg, 19.20 mmol Cl, 1.70 mmol Si, and 0.58 mmol alkyl groups per gram of the solid. The specific surface area measured by the B.E.T. method was 269 $m^2/g$.

(III) Synthesis of a solid catalyst

The above solid (20 g) and 300 ml of titanium tetrachloride were charged into an autoclave having been flushed with nitrogen. The mixture was reacted with stirring at 130° C. for 2 hours. The solid portion was then filtered off, washed fully with n-hexane and dried to obtain a light pink solid (B-16). This solid (19 g) was introduced into a 2-liter flask which had been fully flushed with nitrogen and equipped with a cooler. Thereto were added 600 ml of n-hexane, and 15.0 mmol of ethyl benzoate in n-hexane (0.5 mol/l). The mixture was reacted with stirring at 80° C. for one hour. The solid in the reaction mixture was filtered off, washed fully with n-hexane to obtain a solid (C-16).

Thereafter, 4.0 g of the solid (C-16), together with 25 steel balls 10 mm in diameter, was charged into a steel mill 95 mm in diameter and 100 mm long, and ground by vibration for 5 hours to obtain a solid (D-16).

The above solid (D-16, 4.0 g) was introduced into an autoclave having been flushed with nitrogen, and 30 ml of titanium tetrachloride was added. The mixture was reacted with stirring at 130° C. for 2 hours. The solid portion was filtered off, washed fully with n-hexane and dried to obtain a solid catalyst (S-16). Analysis of this catalyst showed a Ti content of 2.5 wt.%.

(IV) Slurry polymerization of propylene

The solid catalyst (30 mg) syntheized in (III), above, 2.4 mmol of triethylaluminum, and 0.8 liter of fully deaerated, dehydrated hexane were introduced into a 1.5-liter autoclave, the inside of which had been flushed with nitrogen and dried in vacuo. While the temperature inside was being maintained at 60° C., polymerization was allowed to proceed for 2 hours by supplying propylene at a pressure of 5.0 Kg/cm² so as to give a total gauge pressure of 4.8 Kg/cm². There were obtained 154 g of a hexane-insoluble polymer and 8.9 g of hexane-soluble portion. The catalyst efficiency was 2,570 g of PP/g of solid catalyst-hour or 20,500 g of PP/g of Ti component-hour-propylene pressure. After the hexane-insoluble polymer was extracted with n-heptane, the remaining portion was 86.8%. The intrinsic viscosity of hexane-insoluble polymer as measured in tetralin at 135° C. was 5.91 dl/g.

EXAMPLE 17

Slurry polymerization of propylene was carried out in the same manner as in Example 1, except that 30 mg of the solid catalyst (S-16) synthesized in Example 16, 2.4 mmol of triethylaluminum and 0.8 mmol of ethyl benzoate were used. There were obtained 125 g of a n-hexane-insoluble polymer and 4.3 g of a n-hexane-soluble portion. The catalyst efficiency was 16,700 g of PP/g of Ti component-hour-propylene pressure. After the n-hexane-insoluble polymer was extracted with n-heptane, the remaining portion was 95.6%. The polymer had an inherent viscosity of 5.7 dl/g. As for its particle characteristics, the polymer had a bulk density of 0.35 $g/cm^3$, and the particles of 35–150 mesh occupy as much as 91%.

EXAMPLE 18

Slurry polymerization of propylene was carried out in the same manner as in Example 1, using a solution in which 1.6 mmol of triethylaluminum in hexane (1 mol/l) and 0.8 mmol of ethyl benzoate in hexane (1 mol/l) were mixed in advance, 30 mg of the solid catalyst (S-16) synthesized in Example 16, and 0.8 mmol of triethylaluminum. There were obtained 172 g of a hexane-insoluble polymer and 5.6 g of a hexane-soluble portion. After the hexane-insoluble polymer was extracted with n-heptane, the remaining portion was 94.5%. The catalyst efficiency was 23,000 g of PP/g of Ti component-hour-propylene pressure.

EXAMPLE 19

Liquefied propylene (350 g) was introduced into a 1.5-liter autoclave, the inside of which had been flushed with nitrogen and dried in vacuo. While the temperature inside was being maintained at 60° C., 10 mg of the solid catalyst (S-16) synthesized in part (III), Example 16, 1.6 mmol of triethylaluminum, and 0.6 mmol of ethyl benzoate were added. Polymerization was carried out at 60° C. for 2 hours to obtain 141 g of polypropylene (PP). The catalyst efficiency was 7,050 g of PP/g of solid catalyst-hour or 282,000 g of PP/g of Ti component-hour. The formed polypropylene was extracted with n-heptane, and the remaining portion was 93.7%.

COMPARATIVE EXAMPLE 5

A solid catalyst was synthesized by using magnesium chloride in place of a solid material prepared in Example 16 by the reaction of an organomagnesium complex compound with a chlorosilane compound. Anhydrous magnesium chloride (5.0 g) was reacted with 30 ml of titanium tetrachloride at 130° C. for 2 hours in the same manner as in part (III), Example 16 and then further reacted with 4 mmol of ethyl benzoate in n-heptane at 80° C. for one hour. The solid obtained was ground and then treated with titanium tetrachloride to obtain a solid catalyst. Analysis of this solid catalyst showed a Ti content of 0.42 wt.%. Slurry polymerization of propylene was carried out in the same manner as in Example 1, using 400 mg of the above solid catalyst, 3.2 mmol of triethylaluminum and 1.2 mmol of ethyl benzoate. There were obtained 41.0 g of a hexane-insoluble polymer and 12.4 g of a hexane-soluble portion. After the hexane-insoluble polymer was extracted with n-heptane, the remaining portion was 75.5%. The catalyst efficiency was 51.3 g of PP/g of solid catalyst-hour or 2,440 g of PP/g of Ti component-hour-propylene pressure.

COMPARATIVE EXAMPLE 6

In the reaction of an organomagnesium complex compound with a chlorosilane described in part (II), Example 16, there was used methyl-trichlorosilane ($CH_3SiCl_3$) in place of chlorosilane $HSiCl_3$, the same reaction was carried out. A hundred mmol of $CH_3SiCl_3$ solution in n-heptane (1 mol/l) was charged into a 500-ml flask having been flushed with nitrogen. The temperature was elevated up to 65° C., and 100 mmol of an organomagnesium complex solution, synthesized as in (I), Example 16, was added dropwise with stirring at 65° C. Thereafter, the reaction was allowed to proceed for an additional one hour. The solid portion in the reaction mixture was then filtered off, washed with n-hexane, and dried to obtain a solid. This solid was reacted at first with titanium tetrachloride, then with an ethyl benzoate solution, in the same manner as in Example 16. The solid obtained was ground and finally treated with titanium tetrachloride to obtain a solid catalyst. Analysis of this catalyst showed a Ti content of 5.8 wt.%.

Slurry polymerization of propylene was carried out in the same manner as in Example 1, using the above solid catalyst (200 mg), 3.2 mmol of triethylaluminum, and 1.2 mmol of ethyl benzoate. There were obtained 52 g of a hexane-insoluble polymer and 7.3 g of a hexane-soluble portion. After the hexane-insoluble polymer was extracted with boiling n-heptane, the remaining portion was 72.2%. The catalyst yield was 130 g of PP/g of solid catalyst-hour or 448 g of PP/g of Ti component-hour-propylene pressure. The hexane-insoluble polymer had a bulk density of 0.23 g/cm$^3$.

EXAMPLES 20–34

Slurry polymerization of propylene was carried out in the same manner as in Example 1, using 30 mg of the solid catalyst (S-16) synthesized in Example 16, 2.4 mmol of triethylaluminum and 0.8 mmol of compounds listed in Table 4. Results obtained are as given in Table 4.

Table 4

| No. of Examples | Compounds | Polymerization results ||||
|---|---|---|---|---|---|
| | | Polymer yield (g) | Hexane-soluble portion (g) | Remaining portion after extraction with n-heptane (%) | Catalyst efficiency (g-PP/g-Ti component-hour-propylene pressure) |
| 20 | Benzoic acid | 124 | 3.5 | 95.7 | 16500 |
| 21 | p-Toluic acid | 118 | 3.7 | 96.2 | 15700 |
| 22 | Benzoic anhydride | 101 | 5.0 | 94.8 | 13500 |
| 23 | Methyl benzoate | 132 | 4.0 | 95.2 | 17600 |
| 24 | Isopropyl benzoate | 126 | 5.1 | 93.8 | 16800 |
| 25 | n-Butyl benzoate | 121 | 4.4 | 94.6 | 16100 |
| 26 | Methyl p-toluate | 127 | 4.0 | 95.7 | 16900 |
| 27 | Ethyl toluate | 130 | 3.6 | 95.5 | 17300 |
| 28 | Ethyl anisate | 115 | 4.3 | 94.6 | 15300 |
| 29 | Methyl methacrylate | 102 | 6.2 | 93.3 | 13600 |
| 30 | Methyl maleate | 99 | 4.5 | 92.9 | 13200 |
| 31 | Ethyl n-heptanoate | 122 | 4.1 | 95.0 | 16300 |
| 32 | Methyl terephthalate | 108 | 5.1 | 95.1 | 14400 |
| 33 | Benzoyl chloride | 99 | 4.6 | 93.2 | 13200 |
| 34 | Tolyl chloride | 103 | 5.1 | 93.4 | 13700 |

EXAMPLE 35

A 2-liter flask fitted with a dropping funnel and a reflux condenser was fully flushed with nitrogen. To this flask was charged under nitrogen stream 1 mol of monomethyldichlorosilane ($HSiCl_2CH_3$) in one liter of n-heptane. The temperature was elevated up to 65° C. A solution of 500 mmol of an organomagnesium complex, synthesized in the same manner as in part (I), Example 16, was added dropwise through the dropping funnel at 65° C. over one hour, and then the mixture was reacted at this temperature for one hour. A white precipitate thus formed was filtered off, washed with n-hexane and dried to obtain 41.8 g of a white solid material (A-35). Analysis of this solid showed that it contained 9.23 mmol Mg, 19.0 mmol Cl, 1.80 mmol Si, and 0.61 mmol alkyl groups per gram of the solid. The specific surface area measured by the B.E.T. method was 260 m$^2$/g.

Thereafter, 8.0 g of the above white solid (A-35) was taken up in a flask having been flushed with nitrogen, and 240 ml of n-hexane, and 8.0 mmol of ethyl benzoate solution in n-hexane (0.5 mol/l) were added. The mixture was heated to a reflux temperature, and reaction was allowed to proceed with stirring for 1 hour. The solid obtained was filtered off, washed fully with n-hexane and dried to obtain a white solid (B-35).

The above solid (3.0 g) and 30 ml of titanium tetrachloride were charged into an autoclave, and reacted at 130° C. for 2 hours with magnetic stirring. Solid portion was filtered, washed fully with n-hexane to obtain a light yellowish white solid (C-35). The solid obtained was then transferred under a nitrogen stream into a steel mill 95 mm in diameter and 100 mm long, together with 25 steel balls 10 mm in diameter, and was ground on a vibrator for 5 hours. The solid (2.0 g) was taken out of the mill and charged into an autoclave, together with 30 ml of titanium tetrachloride. The mixture was treated at 130° C. with magnetic stirring for 2 hours. The solid portion was filtered, washed fully with n-hexane and dried to obtain a solid catalyst (S-35). Analysis of the solid catalyst showed a Ti content of 2.8 wt.%.

Slurry polymerization of propylene was carried out in the same manner as in Example 1, using 30 mg of the above solid catalyst (S-35) and 2.4 mmol of triethylaluminum. Results obtained were as given in Table 5.

EXAMPLE 36

Slurry polymerization of propylene was carried out in the same manner as in Example 1, using 30 mg of the solid catalyst (S-35) synthesized in Example 35, 2.4 mmol of triethylaluminum and 0.8 mmol of ethyl benzoate. Results obtained were as given in Table 5.

EXAMPLE 37

Slurry polymerization of propylene was carried out in the same manner as in Example 1, using a solution having been made by mixing 1.6 mmol of triethylaluminum in hexane (1 mol/l) and 0.8 mmol of ethyl benzoate in hexane (1 mol/l) in advance, and 30 mg of the solid catalyst (S-35) synthesized in Example 35, and 0.8 mmol of triethylaluminum. Results obtained were as given in Table 5.

Table 5

| Example | Yield of hexane-insoluble polymer (g) | Hexane soluble portion (g) | Remaining portion after extraction with n-heptane (%) | Catalyst efficiency g-PP/g-Ti component-hour-propylene pressure |
|---|---|---|---|---|
| 35 | 158 | 8.2 | 86.8 | 18,800 |
| 36 | 132 | 3.6 | 95.7 | 16,000 |
| 37 | 182 | 5.1 | 94.6 | 22,100 |

EXAMPLE 38

To a 1.5 l autoclave, the inside of which had been flushed with nitrogen and dried in vacuo, 350 g of liquefied propylene was introduced. While holding the inside temperature at 60° C., 10 mg of the solid catalyst synthesized according to the method of Example 35, 1.6 mmol of triethylaluminum and 0.6 mmol of ethyl benzoate were added into the autoclave to carry out polymerization at 60° C. for 2 hours whereby 154 g of polypropylene (PP) was obtained. The catalyst efficiency was 7700 g-PP/g-solid catalyst·hour and 275,000 g-PP/g-Ti component·hr and the remaining portion after extraction with n-heptane was 93.7%.

EXAMPLES 39–48

Organomagnesium complexes were reacted with trichlorosilane ($HSiCl_3$), titanium tetrachloride and ethyl benzoate, in the same manner as in parts (II) and (III), Example 16, using those organomagnesium complexes listed in Table 6 in place of $AlMg_{6.0}(C_2H_5)_{2.9}$(n-$C_4H_9$)$_{12.1}$ described in (I), Example 16. Solids thus obtained were ground and further treated with titanium tetrachloride to obtain solid catalysts. Polymerization was carried out in a hexane solvent in the same manner as in Example 1 using 30 mg of each solid catalyst, 2.4 mmol of triethylaluminum and 0.8 mmol of ethyl benzoate. Conditions of catalyst synthesis and results of polymerization were as given in Table 6.

Table 6

| | Solid Catalyst | | | |
|---|---|---|---|---|
| | | Reaction condition with $HSiCl_3$ | | Ti content in solid catalyst (wt. %) |
| Example | Organomagnesium compounds | Mol ratio Mg/Si | Temperature (°C.) × Time (hr.) | |
| 39 | $AlMg_{6.0}Et_{2.0}$n-$Bu_{9.5}$o-$Bu_{3.5}$ | 5/1 | 65 × 2 | 2.7 |
| 40 | $AlMg_{6.0}Et_{2.0}$n-$Bu_{9.5}$(O—Si(Me)—Et)$_{3.5}$ | 2/1 | 65 × 5 | 2.5 |
| 41 | $AlMg_{4.0}Et_{2.9}$(n-$C_6H_{13}$)$_{8.0}$ | 1/3 | 60 × 2 | 2.9 |
| 42 | $ZnMg_{2.0}Et_{2.0}$n-$Bu_{3.9}$ | 1/1 | 80 × 2 | 2.3 |
| 43 | $BeMg_{4.0}Et_{0.7}$n-$Pr_{6.3}$[N(n-Bu)$_2$]$_{3.9}$ | 1/1 | 80 × 5 | 2.8 |
| 44 | B $Mg_{1.0}Et_{2.8}$n-$Pr_{1.5}$(SEt)$_{0.7}$ | 1/1 | 50 × 5 | 4.9 |
| 45 | n-BuMgCl (ether solution) | 1/1 | 65 × 2 | 2.5 |
| 46 | sec-$Bu_2$Mg | 1/2 | 65 × 2 | 2.8 |
| 47 | n-$C_4H_9$Mg$C_2H_5$ | 1/2 | 65 × 2 | 2.2 |
| 48 | (n-$C_6H_{13}$)$_2$Mg | 1/2 | 65 × 2 | 2.1 |

| | Polymerization result | | | |
|---|---|---|---|---|
| Example | Polymer yield (g) | Hexane soluble portion (g) | Remaining portion after extraction with n-heptane (%) | Catalyst efficiency g-PP/g-Ti component hour propylene pressure |
| 39 | 134 | 9.0 | 93.1 | 16500 |
| 40 | 114 | 3.5 | 95.8 | 15200 |
| 41 | 103 | 6.1 | 93.4 | 11800 |

Table 6-continued

| | | | | |
|---|---|---|---|---|
| 42 | 134 | 10.2 | 91.2 | 19400 |
| 43 | 94 | 3.0 | 95.7 | 11200 |
| 44 | 90 | 4.1 | 94.7 | 6100 |
| 45 | 91 | 3.3 | 93.5 | 12100 |
| 46 | 87 | 4.0 | 94.8 | 10400 |
| 47 | 130 | 11.0 | 94.5 | 19700 |
| 48 | 125 | 9.2 | 95.7 | 18100 |

EXAMPLES 49–50

An organomagnesium complex synthesized as in Example 16 was reacted with trichlorosilane (HSiCl$_3$) to give a solid material, which was then reacted with titanium tetrachloride to obtain 1.9 g of a solid. This solid was reacted with 1.5 mmol of those compounds listed in Table 7 in place of 1.5 mmol of ethyl benzoate. Each solid thus obtained was ground as in Example 16, then treated with titanium tetrachloride. The solid portion was filtered, washed fully and dried to obtain a solid catalyst. Slurry polymerization of propylene was carried out in the same manner as in Example 1, using 30 mg of each solid catalyst, 2.4 mmol of triethylaluminum and 0.8 mmol of a compound used as a liquid catalyst component listed in Table 7. Results obtained were as given in Table 7.

EXAMPLE 60

Slurry polymerization of propylene was carried out in the same manner as in Example 1, using 30 mg of the solid catalyst (S-59) synthesized in Example 59, 2.4 mmol of triethylaluminum and 0.8 mmol of ethyl benzoate. Results obtained were as given in Table 8.

EXAMPLE 61

Slurry polymerization of propylene was carried out in the same manner as in Example 1, using a solution obtained by mixing 1.6 mmol of triethylaluminum in hexane (1 mol/l) and 0.8 mmol of ethyl benzoate in hexane (1 mol/l) in advance, 30 mg of the solid catalyst (S-59) synthesized in Example 59, and 0.8 mmol of triethylaluminum. Results obtained were as given in Table 8.

Table 7

| | Solid catalyst components | | Compounds used as liquid catalyst component | Polymerization results | | | |
|---|---|---|---|---|---|---|---|
| Example | Compounds | Ti content (%) | | Polymer yield (g) | Hexane-soluble portion (g) | Remaining portion after extraction with n-heptane (%) | Catalyst efficiency (g-PP/g-Ti component-hour-propylene pressure) |
| 49 | Benzoic acid | 2.4 | — | 155 | 10.4 | 85.1 | 21500 |
| 50 | " | " | Benzoic acid | 126 | 4.6 | 94.6 | 17500 |
| 51 | Benzoyl chloride | 2.6 | — | 132 | 12.4 | 83.3 | 16900 |
| 52 | " | " | Benzoyl chloride | 109 | 4.2 | 95.1 | 14000 |
| 53 | Benzoic anhydride | 2.7 | — | 131 | 10.6 | 85.7 | 16200 |
| 54 | " | " | Benzoic anhydride | 111 | 4.7 | 94.3 | 13700 |
| 55 | Ethyl p-toluate | 2.5 | — | 165 | 7.2 | 88.0 | 22000 |
| 56 | Ethyl p-toluate | 2.5 | Ethyl p-toluate | 134 | 3.3 | 95.7 | 17900 |
| 57 | Methyl methacrylate | 2.8 | — | 139 | 9.5 | 85.5 | 16500 |
| 58 | " | " | Methyl methacrylate | 116 | 4.4 | 95.2 | 13800 |

EXAMPLE 59

A solid material (B-35, 3.0 g) synthesized in Example 35 and 2.4 mmol of titanium tetrachloride were mixed and ground for 5 hours in a steel mill employed in Example 1. Thereafter, the solid taken out (2.0 g) and 30 ml of titanium tetrachloride were introduced into an autoclave, and stirred magnetically at 130° C. for 2 hours. The solid portion was then filtered, washed fully with n-hexane and dried to obtain a solid catalyst (S-59). Analysis of this solid catalyst showed a Ti content of 3.0 wt.%.

Slurry polymerization of propylene was carried out in the same manner as in Example 1, using 30 mg of the above solid catalyst (S-59) and 2.4 mmol of triethylaluminum. Results obtained were as given in Table 8.

EXAMPLE 62

(I) Synthesis of a hydrocarbon-soluble organomagnesium complex

Di-n-butyl magnesium (138 g), 19.0 g of triethylaluminum and 1 liter of n-heptane were introduced into a 2-liter flask having been flushed with nitrogen. The mixture was reacted at 80° C. for 2 hours to synthesize a solution of an organomagnesium complex. Analysis of this complex showed that it had the composition of AlMg$_{6.0}$(C$_2$H$_5$)$_{2.9}$(n-C$_4$H$_9$)$_{12.1}$ and an organometal concentration of 1.16 mol/l.

(II) Synthesis of a solid material by the reaction with a chlorosilane compound

To a 2-liter flask have been fully dried and flushed with nitrogen was charged with 500 mmol of trichlorosilane (HSiCl$_3$) in n-heptane (1 mol/l), and the temperature was elevated up to 65° C. Five hundred mmol of the organomagnesium complex synthesized in (I) was added dropwise through a dropping funnel with stirring at 65° C. over 1 hour. Reaction was further allowed to proceed at 65° C. for additional one hour. A white precipitate thus formed was isolated, washed with n-hexane and dried to obtain 42.3 g of a white solid (A-62). Analysis of this solid showed that it contained 9.20 mmol Mg, 19.21 mmol Cl, 1.70 mmol Si, and 0.57 mmol alkyl groups per gram of the solid. The specific surface area measured by the B.E.T. method was 274 m$^2$/g.

(III) Synthesis of a solid catalyst component

The white solid synthesized in (II) (20.1 g) and 200 ml of titanium tetrachloride were taken up in an autoclave under nitrogen stream. The mixture was reacted with stirring for 2 hours. The solid portion was then filtered, washed fully with n-hexane and dried to obtain a light purple solid (B-62). Analysis of this solid showed a Ti content of 2.1 wt.%.

The above solid (B-62, 10.0 g) was introduced into a vessel having been flushed with nitrogen, and thereto were added 600 ml of n-hexane and 15 mmol of ethyl benzoate in n-hexane (0.25 mol/l). The mixture was reacted at 80° C. with stirring for 1 hour. The solid in the reaction mixture was filtered, washed fully with n-hexane and dried to obtain a light purple solid (C-62). The solid (C-62) was then ground in the same manner as in Example 35, giving 2.0 g of a solid, which was fed together with 20 ml of titanium tetrachloride in an autoclave under nitrogen stream, and treated with stirring at 130° C. for 2 hours. The solid portion was filtered, washed fully with n-hexane and dried to obtain a solid catalyst (S-62). Analysis of this solid catalyst showed a Ti content of 3.1 wt.%.

Slurry polymerization of propylene was carried out in the same manner as in Example 1, using 30 mg of the above solid catalyst (S-62) and 3.2 mmol of triethylaluminum. Results obtained were as given in Table 8.

EXAMPLE 63

Slurry polymerization of propylene was carried out in the same manner as in Example 1, using 30 mg of the solid catalyst (S-62) synthesized in Example 62, 2.4 mmol of triethylaluminum and 0.8 mmol of ethyl benzoate. Results obtained were as given in Table 8.

EXAMPLE 64

Slurry polymerization of propylene was carried out in the same manner as in Example 1, using a solution obtained by mixing in advance 1.6 mmol of triethylaluminum solution in hexane (1 mol/l) and 0.8 mmol of ethyl benzoate (1 mol/l), 30 mg of the solid catalyst (S-62) synthesized in Example 62 and 0.8 mmol of triethylaluminum. Results obtained were as given in Table 8.

Table 8

| | Polymerization results | | | |
|---|---|---|---|---|
| No. of Ex. | Hexane-insoluble polymer (g) | Hexane-soluble portion (g) | The remaining portion after extraction with n-heptane (%) | Catalyst efficiency (g-PP/g-Ti component-hour-propylene pressure) |
| 59 | 150 | 9.1 | 85.5 | 16700 |
| 60 | 128 | 4.0 | 95.0 | 14200 |
| 61 | 172 | 6.8 | 94.1 | 19100 |
| 62 | 136 | 10.8 | 83.9 | 14600 |
| 63 | 116 | 4.8 | 94.3 | 12500 |
| 64 | 159 | 6.1 | 93.1 | 17100 |

EXAMPLE 65

The solid material such as those (B-35) synthesized in Example 35 was synthesized. An amount of 3.0 g was taken up by weighing and introduced in a steel mill used in Example 19, together with 2.4 mmol of titanium tetrachloride. The mixture was ground for 5 hours. The ground solid (2.1 g) and 30 ml of titanium tetrachloride were introduced into an autoclave, and the mixture was reacted at 110° C. with magnetic stirring for 2 hours. The solid portion was then filtered, washed fully with n-hexane and dried to obtain a solid catalyst (S-65). Analysis of this catalyst showed a Ti content of 2.7 wt.%.

Using 10 mg of the above solid catalyst (S-65), 1.8 mmol of triethylaluminum and 0.6 mmol of ethyl benzoate, slurry polymerization of propylene was carried out in the same manner as in part (IV), Example 1, except that propylene was charged at a pressure of 10 Kg/cm$^2$. There were obtained 120 g of a hexane-insoluble polymer and 4.4 g of hexane-soluble portion. After the hexane-insoluble polymer was extracted with n-heptane, the remaining portion was 95.8%. The catalyst efficiency was 22,200 g of PP/g of Ti component-hour-propylene pressure. The hexane-insoluble polymer had an inherent viscosity of 5.0 dl/g and a bulk density of 0.328 g/cm$^3$. The polymer contained 2 and 60 ppm of Ti and Cl, respectively.

EXAMPLE 66

The magnesium-containing solid (3.85 g) synthesized as in Example 13 (ii), 0.35 g of ethyl benzoate and 0.16 g of titanium trichloride (Grade AA, TiCl$_3$.⅓AlCl$_3$, prepared by Toyo Stauffer Company) were ground under nitrogen atmosphere in a vibrating ball mill for 5 hours. The solid obtained (3.8 g) and 60 ml of titanium tetrachloride were charged into a flask, and the mixture was reacted with stirring at 130° C. for 2 hours. The solid portion was isolated by filtration, washed fully with hexane and dried to obtain a solid catalyst. Analysis of this solid showed a Ti content of 3.44 wt.%.

Polymerization was carried out in a hexane solvent in the same manner as in Example 1, using 40 mg of this solid catalyst component, 2.4 mmol of triethylaluminum, and 0.8 mmol of ethyl benzoate. Results obtained were as given in Table 9.

EXAMPLE 67

A magnesium-containing solid (5.0 g) synthesized as in part (II), Example 13, was reacted with 40 mmol of ethyl benzoate in the same manner as in part (III), Example 13. A solid obtained (4.5 g) and 0.25 g of titanium trichloride (Grade AA, prepared by Toyo Stauffer Company) were ground under nitrogen atmosphere in a vibrating ball mill for 5 hours. The resultant solid (4.3 g) and 60 ml of titanium tetrachloride were reacted with stirring at 130° C. for 2 hours. The solid portion obtained was isolated by filtration, washed fully with hexane and dried to obtain a solid catalyst. Analysis of this catalyst showed a Ti content of 3.47 wt.%.

Polymerization was carried out in the hexane solvent in the same manner as in Example 1, using 40 mg of the solid catalyst, 2.4 mmol of triethylaluminum and 0.8 mmol of ethyl benzoate. Results obtained were as given in Table 9.

EXAMPLE 68

A magnesium-containing solid (5.0 g) synthesized as in part (II), Example 13, and 0.25 g of titanium trichloride (Grade AA, prepared by Toyo Stauffer Company) were ground under nitrogen atmosphere in a vibrating ball mill for 5 hours.

The ground solid (4.8 g) was reacted with ethyl benzoate, then with titanium tetrachloride, in the same manner as in part (III), Example 13, to obtain a solid catalyst. Analysis of this catalyst showed a Ti content of 3.35 wt.%. Polymerization was carried out in a hexane solvent in the same manner as in Example 1, using 40 mg of the solid catalyst, 2.4 mmol of triethylaluminum and 0.8 mmol of ethyl benzoate. Results obtained were as given in Table 9.

EXAMPLE 69

A magnesium-containing solid was reacted at first with titanium tetrachloride, then with ethyl benzoate, in the same manner as in Example 62. The solid obtained was then ground together with titanium trichloride. The resulting solid (3.5 g) was reacted with 60 ml of titanium tetrachloride with stirring at 130° C. for 2 hours. The solid portion was isolated by filtration, washed fully with hexane, and dried to obtain a solid catalyst. Analysis of this catalyst showed a Ti content of 4.25 wt.%.

Polymerization was carried out in the hexane solvent in the same manner as in Example 1, using 30 mg of the solid catalyst, 2.4 mmol of triethylaluminum and 0.8 mmol of ethyl benzoate. Results obtained were as given in Table 9.

EXAMPLE 70

A magnesium-containing solid was reacted at first with ethyl benzoate, then with titanium tetrachoride in the same manner as in Example 13, to obtain a solid which was ground together with titanium trichloride. The solid thus obtained (3.5 g) and 60 ml of titanium tetrachloride were reacted with stirring at 130° C. for 2 hours. The resultant solid portion was isolated by filtration, washed fully with hexane and dried to obtain a solid catalyst. Analysis of this solid catalyst showed a Ti content of 4.14 wt.%.

Polymerization was carried out in the hexane solvent in the same manner as in Example 1, using 30 mg of the solid catalyst component, 2.4 mmol of triethylaluminum, and 0.8 mmol of ethyl benzoate. Results obtained were as given in Table 9.

Table 9

| Example | Yield of hexane-insoluble polymer (g) | Hexane soluble portion (G) | Remaining portion after extraction with n-heptane (%) | Catalyst efficiency g-PP/g-Ti component-hour-propylene pressure |
|---|---|---|---|---|
| 66 | 74 | 3.1 | 94.7 | 5380 |
| 67 | 98 | 3.4 | 95.6 | 7060 |
| 68 | 88 | 3.5 | 95.2 | 6570 |
| 69 | 136 | 4.8 | 95.6 | 10700 |
| 70 | 161 | 4.7 | 96.3 | 13000 |

EXAMPLES 71-73

Slurry polymerization of propylene was carried out in the same manner as in part (IV), Example 1, using 30 mg of a solid catalyst component synthesized as in Example 16, 0.8 mmol of ethyl benzoate, and 2.4 mmol of those organometal compounds listed in Table 10. Results obtained were as given in Table 10.

Table 10

| Examples | Organometal compound | Polymer yield (g) | Hexane-soluble portion (g) | Remaining portion after extraction with n-hexane (%) | Catalyst effeciency g-PP/g-Ti component-hour-propylene pressure |
|---|---|---|---|---|---|
| 71 | Diethylaluminum hydride | 122 | 5.5 | 94.6 | 16300 |
| 72 | Tri-isobutyl aluminum | 160 | 7.1 | 91.0 | 21300 |
| 73 | AlMg$_6$(C$_2$H$_5$)$_{2.9}$-(n-C$_4$H$_9$)$_{12.1}$ | 114 | 6.0 | 92.2 | 15200 |

EXAMPLE 74

Polymerization was carried out, using 50 mg of the solid catalyst (S-1) synthesized in Example 1, 2.4 mmol of triethylaluminum and 0.8 mmol of ethyl benzoate and following the same procedure as in Example 1 except that a propylene-ethylene gas mixture containing 2 mol % of ethylene was used in place of propylene. There was obtained 153 g of a white polymer.

EXAMPLE 75

Polymerization was carried out, using 30 mg of the solid catalyst (S-59) synthesized in Example 59 and 2.4 mmol of triethylaluminum, and following the same procedure as in Example 1, except that a propylene-ethylene gas mixture containing 2 mol % of ethylene was used in place of propylene. There was obtained 149 g of a white polymer.

EXAMPLE 76

Slurry polymerization of a propylene-ethylene mixture was carried out in the same manner as in Example 75, using 30 mg of the solid catalyst (S-59) synthesized in Example 59, 2.4 mmol of triethylaluminum, 0.8 mmol of ethyl benzoate and a propylene-ethylene gas mixture containing 2 mol % of ethylene. There was obtained 133 g of a white polymer.

EXAMPLE 77

Polymerization was carried out, using 30 mg of the solid catalyst (S-59) prepared in Example 59 and 2.4 mmol of triethylaluminum, and following the same procedure as in Example 1, except that a propylene-butene-1 gas mixture containing 2 mol % of butene-1 was used in place of propylene. There was obtained 120 g of a white polymer.

EXAMPLE 78

Polymerization was carried out, using 30 mg of the solid catalyst (S-59) synthesized in Example 59, and 2.4 mmol of triethylaluminum, and following the same procedure as in Example 1, except that a propylene-4-methylpentene-1 gas mixture containing 2 mol % of 4-methylpentane-1 was used in place of propylene. There was obtained 111 g of a white polymer.

EXAMPLE 79

Polymerization of butene-1 was carried out in hexane in the same manner as in Example 1, using 200 mg of the solid catalyst (S-1) synthesized as in Example 1 and 5.0 mmol of triethylaluminum. There was obtained 101 g of a white polymer.

EXAMPLE 80

Polymerization of butene-1 was carried out in hexane in the same manner as in Example 1, using 400 mg of the solid catalyst synthesized in Example 8 and 6.0 mmol of triethylaluminum. There was obtained 86 g of a white polymer.

EXAMPLE 81

Polymerization of butene-1 was carried out in hexane in the same manner as in Example 1, using 200 mg of the solid catalyst synthesized in Example 13 and 6.0 mmol of triethylaluminum. There was obtained 131 g of a white polymer.

EXAMPLE 82

Polymerization of butene-1 was carried out in hexane in the same manner as in Example 1, using 200 mg of the solid catalyst (S-59) synthesized in Example 59 and 5.0 mmol of triethylaluminum. There was obtained 146 g of a white polymer.

EXAMPLE 83

Polymerization of butene-1 was carried out in hexane in the same manner as in Example 1, using 200 mg of the solid catalyst (S-59) prepared in Example 59 and 5.0 mmol of triethylaluminum and 1.2 mmol of ethyl benzoate. There was obtained 130 g of a white polymer.

EXAMPLE 84

Polymerization of 4-methylpentene-1 was carried out in hexane in the same manner as in Example 1, using 200 mg of the solid catalyst (S-1) synthesized in Example 1 and 5.0 mmol of triethylaluminum. There was obtained 88 g of a white polymer.

EXAMPLE 85

Polymerization of 4-methylpentene-1 was carried out in hexane in the same manner as in Example 1, using 400 mg of the solid catalyst synthesized as in Example 8 and 6.0 mmol of triethylaluminum. There was obtained 64 g of a white polymer.

EXAMPLE 86

Polymerization of 4-methylpentene-1 was carried out in hexane in the same manner as in Example 13, using 200 mg of the solid catalyst synthesized as in Example 13 and 6.0 mmol of triethylaluminum. There was obtained 93 g of a white polymer.

EXAMPLE 87

Polymerization of 4-methylpentene-1 was carried out in hexane in the same manner as in Example 1, using 200 mg of the solid catalyst (S-59) synthesized in Example 59 and 5.0 mmol of triethylaluminum. There was obtained 108 g of a white polymer.

EXAMPLE 88

Polymerization of 4-methylpentene-1 was carried out in hexane in the same manner as in Example 1, using 200 mg of the solid catalyst (S-59) synthesized in Example 59, 5.0 mmol of triethylaluminum and 1.2 mmol of ethyl benzoate. There was obtained 94 g of a white polymer.

What is claimed is:

1. In a catalyst useful for polymerizing olefins comprising a magnesium compound, a titanium compound, an electron donor, and an organometallic compound, the improvement which is characterized in that a solid (1) is obtained by reacting one mole of organomagnesium component (i) represented by the general formula $$M_\alpha Mg_\beta R^1_p R^2_q X_r Y_s$$

wherein
$\alpha$ is a number of 0 or greater than 0;
$\beta > 0$;
p, q, r and s are each numbers 0 or greater than 0, respectively, having the relationship of $p+q+r+s = m\alpha + 2\beta$;
M is a metal component of the 1st to the 3rd group of the Periodic Table;
m is the valency of M;
$R^1$ and $R^2$ are the same or different hydrocarbon groups having 1–20 carbon atoms;
X and Y are the same or different groups selected from the group consisting of halogen, $OR^3$, $OSiR^4R^5R^6$, $NR^7R^8$ and $SR^9$,
wherein
$R^3$, $R^4$, $R^5$, $R^6$, $R^7$ and $R^8$ are hydrogen atoms or hydrocarbon groups having 1–20 carbon atoms, and
$R^9$ is a hydrocarbon group having 1–20 carbon atoms, with 0.01–100 moles of chlorosilane compound (ii) containing Si-H bonds and represented by the general formula $$H_a SiCl_b R_{4-(a+b)}$$

wherein
$0 < a \leq 2$,
b is a number greater than 0,
$a+b \leq 4$, and
R is a hydrocarbon group having 1–20 carbon atoms, that a solid catalyst component (A) is obtained by grinding, or reacting and grinding said solid (1), a titanium compound (2) selected from a tetravalent titanium halide and/or a trivalent titanium halide, and a carboxylic acid or a derivative thereof (3) selected from a carboxylic acid having up to 30 carbon atoms, an acid halide having up to 30 carbon atoms, an acid anhydride or a carboxylic acid ester having up to 30 carbon atoms in the carboxylic portion, and that said catalyst component (A) is used with a component (B) comprising an organometallic compound of a metal selected from Groups I, II, III of the Periodic Table mixed with a carboxylic acid or derivative thereof selected from a carboxylic acid having up to 30 carbon atoms, an acid halide, an acid anhydride or a carboxylic acid ester having up to 30 carbon atoms in the carboyxlic portion.

2. A catalyst for polymerizing olefins according to claim 1, wherein said organomagnesium component (i) is a hydrocarbon soluble organomagnesium complex compound wherein α is a number greater than 0,
M is an atom selected from the group consisting of aluminum, boron, zinc and beryllium, and
X and Y are groups other than halogen, respectively.

3. A catalyst for polymerizing olefins according to claim 1, wherein said organomagnesium component (i) is a hydrocarbon soluble organomagnesium compound wherein α is 0, and
X and Y are groups other than halogen, respectively.

4. A catalyst for polymerizing olefins according to claim 2, wherein the ratio of β/α is in the range of 0.5-10.

5. A catalyst for polymerizing olefins according to claim 2, wherein the ratio of (r+s)/(α+β) is in the range of 0-0.8.

6. A catalyst for polymerizing olefins according to claim 1, wherein said titanium compound (A) (2) is titanium tetrachloride.

7. A catalyst for polymerizing olefins according to claim 1, wherein said titanium compound (A) (2) is titanium trichloride.

8. A catalyst for polymerizing olefins according to claim 1, wherein said titanium compound (A) (2) is a tetravalent titanium halide or a trivalent titanium halide.

9. A catalyst for polymerizing olefins according to claim 1, wherein said titanium compound (A) (2) is titanium tetrachloride or titanium trichloride.

10. A catalyst for polymerizing olefins according to claim 1, wherein said carboxylic acid or derivative thereof (A) (3) is used in 0.001-50 times the molar amount of the hydrocarbon groups included in the solid obtained by reacting the organomagnesium component and chlorosilane compound containing Si-H bonds.

11. A catalyst for polymerizing olefins according to claim 1, wherein said organometallic compound (B) is a hydrocarbon soluble organomagnesium complex compound having the general formula $M_\alpha Mg_\beta R^1_p R^2_q X_r Y_s$ wherein α and β are numbers greater than 0,
β/α is in the range of 0.1-10,
p, q, r and s are 0 or a number greater than 0, respectively, having the relationships $p+q+r+s=m\alpha+2\beta$ and
$0 \leq (r+s)/(\alpha+\beta) < 1.0$, wherein M is an atom selected from the group consisting of aluminum, zinc, boron and beryllium, m is the valency of M, $R^1$ and $R^2$ are the same or different hydrocarbon groups having 1-20 carbon atoms, X and Y are the same or different groups selected from the group consisting of $OR^3$, $OSiR^4R^5R^6$, $NR^7R^8$ and $SR^9$ wherein $R^3$, $R^4$, $R^5$, $R^6$, $R^7$ and $R^8$ are hydrogen atoms or a hydrocarbon group having 1-20 carbon atoms and $R^9$ is a hydrocarbon group having 1-20 carbon atons.

12. A catalyst for polymerizing olefins according to claim 11, wherein M of said organomagnesium complex compound is an aluminum atom.

13. A polymerization catalyst according to claim 1, wherein said organometallic compound (B) is an organoaluminum compound having the general formula $AlR^{10}_t Z_{3-t}$ wherein $R^{10}$ is a hydrocarbon group having 1-20 carbon atoms,
Z is a member selected from the group consisting of hydrogen, halogen, alkoxy, aryloxy and a siloxy group, and
t is from 2-3.

14. A polymerization catalyst according to claim 13, wherein said organoaluminum compound is a trialkylaluminum or a dialkylaluminum hydride.

15. A polymerization catalyst according to claim 1, wherein said component (B) consisting of an organoaluminum compound and a carboxylic acid or its derivative is used by adding separately the product obtained by first reacting one part of an organoaluminum component having the general formula $AlR^{10}_t Z_{3-t}$ wherein $R^{10}$ is a hydrocarbon group having 1-20 carbon atoms,
Z is a member selected from the group consisting of hydrogen, halogen, alkoxy, aryloxy and siloxy groups, with a carboxylic acid or its derivative, and then adding the remaining organoaluminum compound.

16. In a catalyst useful for polymerizing olefins comprising a magnesium compound, a titanium compound, an electron donor, and an organometallic compound, the improvement which is characterized in that a solid (1) is obtained by reacting one mole of organomagnesium component (i) represented by the general formula $M_\alpha Mg_\beta R^1_p R^2_q X_r Y_s$ wherein α is a number of 0 or greater than 0;
β>0;
p, q, r and s are each numbers 0 or greater than 0, respectively, having the relationship of $p+q+r+s=m\alpha+2\beta$;
M is a metal component of the 1st to the 3rd group of the Periodic Table;
m is the valency of M;
$R^1$ and $R^2$ are the same or different hydrocarbon groups having 1-20 carbon atoms;
X and Y are the same or different groups selected from the group consisting of halogen, $OR^3$, $OSiR^4R^5R^6$, $NR^7R^8$ and $SR^9$, wherein R³, R⁴, R⁵, R⁶, R⁷ and R⁸ are hydrogen atoms or hydrocarbon groups having 1-20 carbon atoms, and R⁹ is a hydrocarbon group having 1-20 carbon atoms, with 0.01-100 moles of chlorosilane compound (ii) containing Si-H bonds and represented by the general formula $$H_aSiCl_bR_{4-(a+b)}$$

wherein
$0 < a \leq 2$,
b is a number greater than 0,
$a + b \leq 4$, and
R is a hydrocarbon group having 1-20 carbon atoms, that a solid catalyst component (A) is obtained by reacting and/or grinding said solid 1, a titanium compound (2) selected from a tetravalent titanium halide and/or a trivalent titanium halide, and a carboxylic acid or a derivative thereof (3) selected from a carboxylic acid having up to 30 carbon atoms, an acid halide having up to 30 carbon atoms, an acid anhydride or a carboxylic acid ester having up to 30 carbon atoms in the carboxylic portion, and then treating the resulting solid with a tetravalent titanium halide (4), and that said catalyst component (A) is used with a component (B) comprising an organometallic compound of a metal selected from Groups I, II, III of the Periodic Table.

17. A catalyst for polymerizing olefins according to claim 16, wherein said organomagnesium component (i) is a hydrocarbon soluble organomagnesium complex compound wherein
α is a number greater than 0,
M is an atom selected from the group consisting of aluminum, boron, zinc and beryllium, and
X and Y are groups other than halogen, respectively.

18. A catalyst for polymerizing olefins according to claim 16, wherein said organomagnesium component (i) is a hydrocarbon soluble organomagnesium compound wherein
α is 0, and
X and Y are groups other than halogen, respectively.

19. A catalyst for polymerizing olefins according to claim 16, wherein the ratio of $\beta/\alpha$ is in the range of 0.5-10.

20. A catalyst for polymerizing olefins according to claim 16, wherein the ratio of $(r+s)/(\alpha+\beta)$ is in the range of 0-0.8.

21. A catalyst for polymerizing olefins according to claim 16, wherein said titanium compound (A) (4) is titanium tetrachloride.

22. A catalyst for polymerizing olefins according to claim 16, wherein said titanium compound (A) (2) is titanium tetrachloride.

23. A catalyst for polymerizing olefins according to claim 16, wherein said titanium compound (A) (2) is titanium trichloride.

24. A catalyst for polymerizing olefins according to claim 16, wherein said titanium compound (A) (2) is a tetravalent titanium halide or a trivalent titanium halide.

25. A catalyst for polymerizing olefins according to claim 16, wherein said titanium compound (A) (2) is titanium tetrachloride or titanium trichloride.

26. A catalyst for polymerizing olefins according to claim 16, wherein said carboxylic acid or derivative thereof (A) (3) is used in 0.001-50 times the molar amount of the hydrocarbon groups included in the solid obtained by reacting the organomagnesium component and chlorosilane compound containing Si-H bonds.

27. A catalyst for polymerizing olefins according to claim 15, wherein said organometallic compound (B) is a hydrocarbon soluble organomagnesium complex compound having the general formula $$M_\alpha Mg_\beta R_p^1 R_q^2 X_r Y_s$$

wherein
α and β are numbers greater than 0,
$\beta/\alpha$ is in the range of 0.1-10,
p, q, r and s are 0 or a number greater than 0, respectively, having the relationships $p+q+r+s = m\alpha + 2\beta$ and
$0 \leq (r+s)/(\alpha+\beta) < 1.0$, wherein M is an atom selected from the group consisting of aluminum, zinc, boron and beryllium, m is the valency of M, R¹ and R² are the same or different hydrocarbon groups having 1-20 carbon atoms,
X and Y are the same or different groups selected from the group consisting of OR³, OSiR⁴R⁵R⁶, NR⁷R⁸ and SR⁹ wherein R³, R⁴, R⁵, R⁶, R⁷ and R⁸ are hydrogen atoms or a hydrocarbon group having 1-20 carbon atoms and R⁹ is a hydrocarbon group having 1-20 carbon atoms.

28. A catalyst for polymerizing olefins according to claim 27, wherein M of said organomagnesium complex compound is an aluminum atom.

29. A polymerization catalyst according to claim 16, wherein said organometallic compound (B) is an organoaluminum compound having the general formula $$AlR_t^{10}Z_{3-t}$$

wherein
R¹⁰ is a hydrocarbon group having 1-20 carbon atoms,
Z is a member selected from the group consisting of hydrogen, halogen, alkoxy, aryloxy and a siloxy group, and
t is from 2-3.

30. A polymerization catalyst according to claim 29, wherein said organoaluminum compound is a trialkylaluminum or a dialkylaluminum hydride.

31. A polymerizaion catalyst according to claim 16, wherein said component (B) consisting of an organoaluminum compound and a carboxylic acid or its derivative is used by adding separately the product obtained by first reacting one part an organoaluminum component having the general formula $$AlR_t^{10}Z_{3-t}$$

wherein
R¹⁰ is a hydrocarbon group having 1-20 carbon atoms,
Z is a member selected from the group consisting of hydrogen, halogen, alkoxy, aryloxy and siloxy groups, with a carboxylic acid or its derivative, and then adding the remaining organoaluminum compound.

32. A catalyst for polymerizing olefins according to claim 16, wherein component (B) in addition to the organometallic compound includes a carboxylic acid or derivative thereof selected from the carboxylic acid having up to 30 carbon atoms, an acid halide, an acid anhydride or a carboxylic acid ester having up to 30 carbon atoms in the carboxylic portion.

* * * * *